United States Patent

Subbarao

[11] Patent Number: 6,134,511
[45] Date of Patent: Oct. 17, 2000

[54] METHOD AND APPARATUS FOR IMPROVING BUILDING ENERGY SIMULATIONS

[76] Inventor: Krishnappa Subbarao, 15241 W. Archer Dr., Golden, Colo. 80401-5076

[21] Appl. No.: 09/060,734

[22] Filed: Apr. 15, 1998

[51] Int. Cl.[7] .................................................. G06F 17/50
[52] U.S. Cl. .................................................. 703/6; 703/1
[58] Field of Search .................................. 703/1, 5, 6, 7; 395/500.01, 500.24, 500.27, 500.28

[56] References Cited

U.S. PATENT DOCUMENTS 4,454,513   6/1984   Russell ..................................... 342/174

OTHER PUBLICATIONS

J.D. Balcomb, J. d. Burch, R. Westby, C.E. Hancock, and K. Subbarao; 'Short Term Energy monitoring for Commercial Buildings' ACEEE 1994 Summer Study on Energy Efficiency in Buildings, ACEEE vol. 5.

PSTAR—*Primary and Secondary Terms Analysis and Renormalization* (SERI/TR–254–3175) by K. Subbarao; Solar Energy Research Institute, Golden, CO.; Sep. 1988; pp i–ix and 1–84.

*Short–Term Energy Monitoring for Commercial Buildings* by J. D. Balcomb, J. D. Burch, R. Westby, C. E. Hancock, and K. Subbarao; ACEEE 1994 Summer Study on Energy Efficiency in Buildings, American Council for an Energy Efficient Economy, Washington, D.C. 20036; vol. 5, pp. 5.1–5.11.

STEM (Short–Term Energy Monitoring) 1.1 User Manual 1989; available from Solar Energy Research Institute Golden, CO.; Parts I–IX and Appendix A.

BLAST User's Manual (1986); University of Illinois 1206 West Green Street, Urbana, Illinois; Introduction, pp. 1–1 to 1–14.

DOE–2 Supplement (Version 2.1E/Jan. 1994); Lawrence Berkeley Laboratory, Berkeley, CA. 94720; pp. I.1 to I.9.

*Primary Examiner*—Kevin J. Teska
*Assistant Examiner*—Lonnie A. Knox
*Attorney, Agent, or Firm*—Jenkens & Gilchrist, P.C.

[57] ABSTRACT

Calibration of building energy simulations with performance data is accomplished by introducing corrective heat flows. A building is modeled on a simulator with descriptive inputs derived from a building audit. The performance predicted by the simulator under the measured driving functions is compared with the measured performance (e.g., of indoor temperatures and/or energy use). Corrective heat flows are calculated from calibration parameters and primary heat flows. The corrective heat flows are then incorporated as additional internal gains and applied to the simulator to minimize the differences between predicted and measured performances. Performance of Heating, Ventilation, and Air-Conditioning systems is included by introducing and estimating additional parameters. The calibrated simulator can be used, for example, to simulate future performance under given weather conditions and thermostatic constraints by repeating the simulation in an iterative manner, with improved values of the corrective heat flows being computed at each iteration. Additionally, the calibration parameters can also be used as a guide to modify the audit inputs to the simulation to thereby reduce the magnitude of the corrective heat flows. The calibrated simulations can be used for the commissioning, diagnosing, optimal controlling, evaluation, and identification of retrofit opportunities of buildings.

56 Claims, 19 Drawing Sheets

METHOD AND APPARATUS FOR IMPROVING BUILDING ENERGY SIMULATIONS

BACKGROUND OF THE INVENTION

1. Technical Field of the Invention

The present invention relates in general to calibrating building energy simulations with performance data, and in particular, to a method and apparatus for applying corrective flows to better calibrate an audit building to the actual building.

2. Description of Related Art

Simulation tools to determine the energy performance of buildings aid in the analysis and design of energy-efficient buildings. When combined with performance data, simulation tools offer the possibility of evaluating, commissioning, diagnosing, optimally controlling, and identifying retrofit opportunities for buildings. Such simulations typically combine a description of the building and HVAC (Heating, Ventilating, and Air-Conditioning) systems with weather and occupancy-related data to calculate energy requirements. Because of the complexity of the computations, as well as input and output requirements, such simulations are usually implemented in the form of computer programs. Examples of such programs in the public domain are: BLAST (BLAST User's Manual 1986 is available from BLAST Support Office, University of Illinois, 1206 West Green Street, Urbana, Ill. 61801) and DOE-2 (DOE-2 Supplement (Version 2.1E/January 1994) is available from Lawrence Berkeley Laboratory, Energy and Environment Division, Berkeley, Calif. 94720).

Depending on the focus of the building analysis, restricted computations may be performed. For example, when the performance of the building shell is the focus, the simulations may be restricted to computing heating and cooling loads, without explicit consideration as to how these loads are met. (Heating and cooling loads refer to the amount of heat to be supplied or removed to provide specified space-conditioning; HVAC equipment operates by consuming electricity and/or gas and/or other energy source to satisfy this demand.) Time steps of one hour are common for these simulations, although selecting an hourly time step is only a matter of convenience. As noted above, several computer programs exist. Each differs in the manner in which it accounts for the complex details of the building, the related HVAC system, weather conditions, and occupancy characteristics; each program also differs in its input/output features. Some programs have been adopted as standard simulators in various projects.

Regardless of which of the several computer programs is utilized, when the simulated energy performance is compared with the measured energy performance, differences frequently exist. A variety of data may be used for comparison purposes. Such data includes fuel use (e.g., electricity), temperatures of various zones at an hourly or other interval, and consumption data recorded in utility bills. The data may be acquired by a variety of means such as from an existing energy management system in the building, from specially installed data loggers, from billing records, or any combination thereof. The data may be acquired, at least in part, by imposing conditions on the building deemed favorable to elicit certain building responses. Attempts may be made to reconcile the differences between simulated and measured performances by modifying the simulations in some manner to reduce the disagreement. Such a process is sometimes referred to as calibration or tuning of the simulations.

Because of the large number of inputs (often several hundred) to a simulation, attempts to directly modify the inputs to provide a best-fit have encountered serious difficulties. Using typically monitored data, it is not possible to calibrate the simulation by estimating the hundreds of inputs; therefore, approximations are necessary. Ad hoc adjustments of inputs, that are unfortunately not mathematically well-formulated, have been resorted to. A systematic method to perform a best fit on hourly data is an important need that remains unanswered by existing methodologies.

An approach called PSTAR was developed (Subbarao, K., "PSTAR-Primary and Secondary Terms Analysis and Renormalization" SERI/TR-254-3175 1988, which is available from Solar Energy Research Institute (now National Renewable Energy Laboratory), Golden, Colo.; see also "Short-Term Energy Monitoring for Commercial Buildings" by J. D. Balcomb, J. D. Burch, R. Westby, C. E. Hancock, and K. Subbarao, ACEEE 1994 Summer Study on Energy Efficiency in Buildings, American Council for an Energy Efficient Economy, Washington, D.C. 20036, Vol. 5, P. 1.) that modifies the heat flows in the energy balance instead of the direct inputs to the simulation. The various heat flows are calculated individually by combining the building characteristics obtained from a building audit with the measured driving functions.

Energy balance requires that they add up to zero for every hour or time step. However, due to differences between the audit building and the actual building, the heat flows do not usually add up to zero. Parameters are introduced to multiply (or "renormalize") the primary heat flows and are estimated from test data through a least squares fit to energy balance. (Introducing parameters associated with secondary terms and estimating them from data entails the danger of fitting on noise.) The test protocol as a way to elicit the parameters as well as heat flows to account for such features as phase shift of solar gains were introduced. To use the estimated parameters for predicting heating and cooling loads under different conditions (for example, to predict loads over a long-term period such as a year), a simplified program was developed. Furthermore, to convert heating and cooling loads to electrical and gas energy use requires simulation of systems and plants. Simple models with limited features were developed for this purpose. A software package called STEM (Short-Term Energy Monitoring) was developed to perform these computations (STEM-1.0 User Manual 1989, which is available from Solar Energy Research Institute (now National Renewable Energy Laboratory), Golden, Colo.).

The existing STEM package has three primary deficiencies. First, the STEM software performs explicit energy balance by disaggregating the heat flows that contribute to the energy balance and then computing all of them. This amounts to the development of a simulator. This is such a complex task that oversimplified models are used to compute some of these heat flows. (Some of the heat flows can be computed, at least in principle, from any simulator, such as DOE-2, by disabling certain features as discussed hereinbelow. With complex simulators, disabling certain features can result in unintended and undesirable effects, which in turn result in erroneous heat flows. In some situations, such disabling may be impossible.) A second STEM deficiency is that to incorporate the estimated parameters for determining long-term performance, such as annual energy use, many issues have to be addressed. Only limited capabilities are available, however. The third primary STEM deficiency is that only limited HVAC systems are modeled, and even so, their operation is oversimplified. These systems include pumps, fans, coils, control set-points, economizers, boilers, chillers, and humidifiers. Simulators such as DOE-2, on the other hand, accommodate a large number of systems and plants as well as various control options.

In other words, the features and simulation capabilities of STEM cannot compare to many commercial and public domain simulators already available. These commercial and public domain simulators have been developed over many years and at the expense of millions of dollars. Some are also carefully tailored to specific simulation tasks. Even attempting to develop a STEM-like program on par with these existing simulators would be a cost-prohibitive, unjustifiable expense. Furthermore, linking STEM with one of these existing programs is difficult to impossible and would provide only inadequate results. Hence, while several simulators have been developed at great effort with various user-communities as the target, a general method that results in a simulator of the user's choice that is calibrated to performance data remains an important need that is unanswered by existing computer programs and packages. In other words, the ability to use a powerful, extensive, well-documented, and thoroughly-tested simulator in conjunction with systematic and accurate calibration techniques has thus far eluded researchers. The present invention is directed to remedying this need as well as meeting the below-enumerated (and other) objects of the invention.

OBJECTS AND SUMMARY OF THE INVENTION

An object of the present invention is to provide a method and apparatus for accurately calibrating building energy simulations with performance data in order to enable evaluation, commissioning, diagnostics, and optimal control of buildings as well as to identify retrofit opportunities.

Another object of the present invention is to provide the method and apparatus in a manner to enable use of any building energy simulator, both present and future.

Yet another object of the present invention is to provide a comprehensive method and apparatus to address the building shell as well as HVAC (Heating, Ventilation and Air-Conditioning) systems.

Yet another object of the present invention is the ability to use a variety of available data, including data from an existing energy management system, specifically installed data loggers, meters, and utility billing data.

A further object of the present invention is to use data taken under test conditions, where the building is operated according to a protocol designed to elicit certain building responses, as well as to use data taken under normal operating conditions.

A still further object of the present invention is the ability to employ systematic and mathematically well-founded formulations that permit rigorous methods for estimating calibration parameters as well as their uncertainties.

These and other objects are achieved by a method and apparatus for calibrating a given building energy simulation using performance data. The model does not rely solely on direct modification of the simulation inputs. Rather, the invention preferably introduces corrective flows. The method of the present system includes modeling the building on a chosen simulator with inputs derived from a building audit, introducing corrective flows with associated parameters, identifying additional parameters related to system (e.g., an HVAC system) and plant descriptions, and estimating them from performance data. The framework is mathematically well-defined, and allows use of standard linear and non-linear parameter estimation techniques and error analysis.

In a preferred embodiment, data is acquired according to a test protocol designed to elicit the parameters, and estimate them, in a sequential and iterative manner in different data segments. In the absence of such data, simultaneous estimation of all the parameters is possible. The estimated parameters associated with the corrective flows can also be used as a guide to modify the inputs to the simulation, such that the magnitudes of the corrective heat flows are reduced in a subsequent simulation run. The simulation with the corrective heat flows and estimated system and plant parameters is the calibrated simulation that accounts for the differences between the audit building and the actual building.

A variety of data may be used for calibration. To determine energy requirements under measured indoor temperatures and driving functions, the calibrated simulation is performed under these conditions. To determine energy requirements subject to given thermostatic constraints and with given driving functions, the simulation is performed in an iterative manner starting from the building with no corrective flows, and successively introducing improved corrective flows until convergence. The temperatures and energy use of the calibrated building is given at this convergence. A comparison between the measured and design-based simulated performance can be the basis for commissioning, and a comparison between the measured and simulated performance can be the basis for diagnostics and evaluations. The calibrated simulation can be the basis for identifying retrofit benefits.

The above-described and other features of the present invention are explained in detail hereinafter with reference to the illustrative examples shown in the accompanying drawings. Those skilled in the art will appreciate that the described embodiments are provided for purposes of illustration and understanding and that numerous equivalent embodiments are contemplated herein.

BRIEF DESCRIPTION OF THE DRAWINGS

A more complete understanding of the method and apparatus of the present invention may be had by reference to the following detailed description when taken in conjunction with the accompanying drawings wherein.

DETAILED DESCRIPTION OF THE INVENTION

In the following description, for purposes of explanation and not limitation, specific details are set forth, such as computer configurations, flow diagrams, techniques, etc. in order to provide a thorough understanding of the invention. However it will be apparent to one of ordinary skill in the art that the present invention may be practiced in other embodiments that depart from these specific details. In other instances, detailed descriptions of well-known methods, devices, and software code are omitted so as not to obscure the description of the present invention with unnecessary detail.

A preferred embodiment of the present invention and its advantages are best understood by referring to FIGS. 1–16 of the drawings, like numerals being used for like and corresponding parts of the various drawings. The terminology in this document, unless otherwise noted, is as follows: the input for the simulation is prepared from information gathered from a building audit. This will be referred to as the audit description of the building or sometimes simply as the audit building. The building description reconciled with data will be referred to as calibrated building. The calibrated building is a closer representation of the actual building than the audit building. The method and apparatus of this invention starts with the audit building and through a systematic procedure arrives at the calibrated building. If the data used in the process were acquired through a protocol designed to elicit the parameters to be estimated, such data will be referred to as test data. Monitored data and performance data are more-general terms that can connote, for example, data collection during a building's normal operation.

The collection of inputs to a typical simulation is usually grouped conveniently into Loads, Systems, and Plants. Plants (or primary equipment) refers to boilers, chillers, etc. that provide hot/cold air/liquid for space conditioning. Systems (or secondary equipment) refers to fans, pumps, coils, thermostats, etc. Systems and Plants may be packaged in a single unit such as a roof-top unit. Loads refers to the building shell, lighting, internal gains, etc. and may include nominal thermostatic set-points. The inventive calibration of a simulation at the building (or zone) level that includes Loads, Systems, and Plants is described hereinbelow. It should be understood that a full HVAC system includes both System and Plant aspects.

Figure 1:
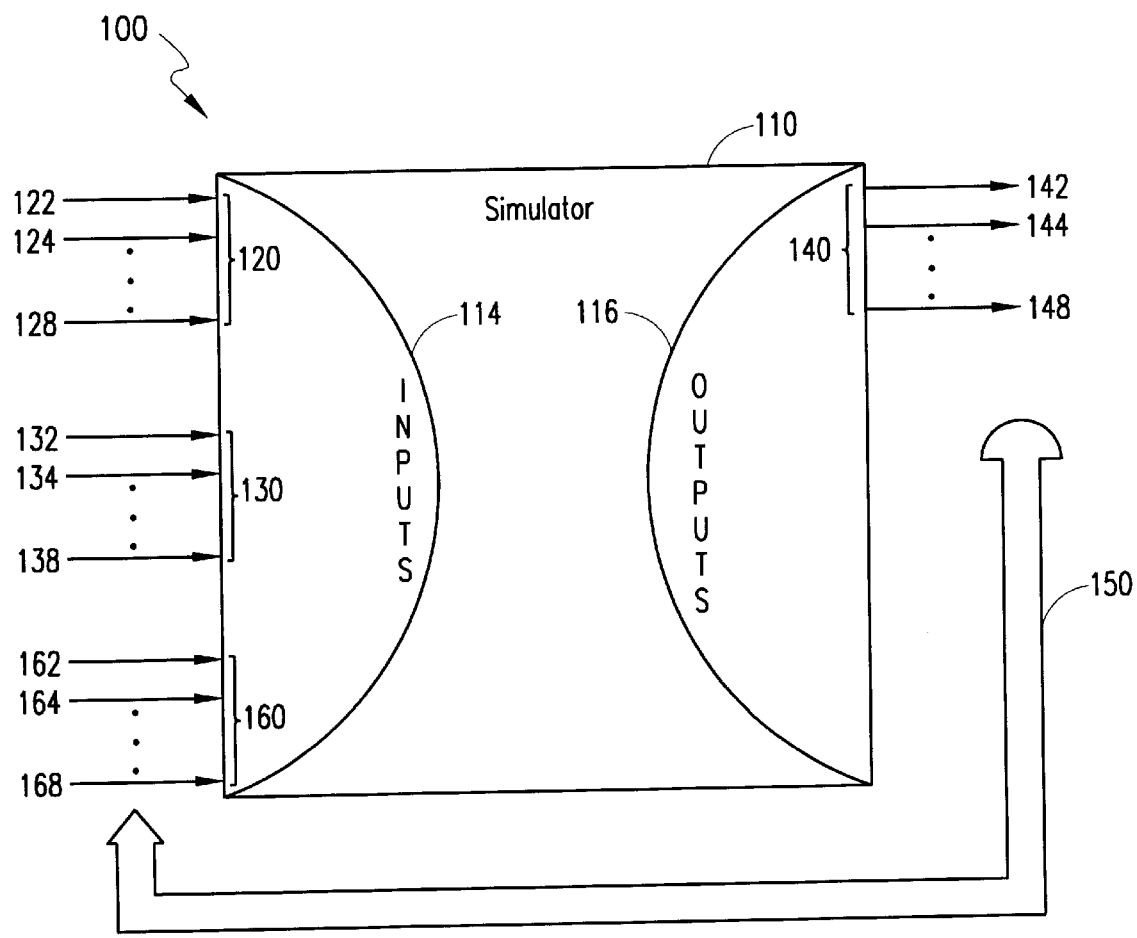
FIG. 1 illustrates a general simulation calibration process according to the present invention.

The method and apparatus are applicable, with suitable modifications derivable from the general description and specific examples given in this document, for calibrating any detailed building energy simulator. Referring now to FIG. 1, a calibration of a building simulation according to the present invention is illustrated generally at 100. The building simulation 100 may be performed by any general building simulator 110, including popular commercial and public domain programs. This advantageously enables the use of a preferred simulator (e.g., preferred because an individual is particularly familiar with the given simulator or preferred because the given simulator is particularly adept at performing the intended simulation) in conjunction with the corrective flows aspect of the present invention. It should be understood that the calibration of the building simulation via the corrective flows as determined by shell parameters synergistically improves the ability to calibrate other building parameters, such as those parameters pertaining to the HVAC system. Continuing with the building simulation calibration 100, the simulator 110 receives inputs 114 and produces corresponding outputs 116. Two subsets of the inputs 114 are the audit inputs 120 and the driving functions inputs 130.

The audit inputs 120 include the values of Load, System, and Plant characteristics that are dictated by the construction, components, and equipment within a given building. These audit inputs 120 (which typically total in the hundreds) include building shell audit values 122, HVAC system audit values 124, and general audit values 128. Examples of the building shell audit values 122 are wall thickness, wall construction material, and insulation. The driving functions inputs 130 include such factors as weather elements 132 (e.g., ambient temperature and relative humidity) and solar radiation 134. A general driving function value 138 is also illustrated.

After the simulator 110 has received the audit inputs 120 and the driving functions inputs 130 and performed a simulation, outputs 116 are produced. The outputs 116 include simulated values 140. Examples of such simulated values are simulated energy use values 142 and simulated zone temperatures 144. A general simulated value 148 is also illustrated. The three general values 128, 138, and 148 (audit, driving function, and simulated, respectively) exemplify that many additionally values that are not specifically enumerated here are input to or output from the simulator 110.

According to a preferred embodiment of the present invention, the totality of the calibration process involves shell and HVAC calibration parameters. Preferably initially, one or more of the simulated values 140 are analyzed and shell calibration parameters (denoted as δ hereinbelow) are determined from the analysis. Different calibration parameters δ can be elicited in different data windows as will be explained fully hereinbelow. Each calibration parameter δ is associated with a primary flow 335 (as illustrated in FIGS. 3B and 3C). The product of each calibration parameter δ and its associated primary flow 335 is termed a corrective heat flow 160, each of which enters the simulator 110 as an input 114. It should be noted that these calibration parameter δs also improve the totality of the calibration process and therefore improve the application of the HVAC calibration parameters 350 as well (as illustrated in FIGS. 3B and 3C). These two sets of calibration parameters are preferably estimated by a best fit of simulated energy use to measured energy use. Alternatively, for example, the best fit analysis can be of simulated zone temperature(s) to measured zone temperature(s).

Examples of possible corrective heat flows 160 are corrective static-loss-from-the-building-shell heat flow 162 and corrective discharge/charge-of-masses-due-to-inside-temperature-variations heat flow 164. A general corrective heat flow 168 is also illustrated to represent that other corrective heat flows can be applied. These corrective heat flows 160 are input into the simulator 110 preferably as if they were one or more of the driving functions inputs 130. The simulator 110 operates as if new values of driving functions are presented, thus enabling the use of any general (including, a commercial or public domain) simulator. However, the net effect of applying the inventive corrective heat flows 160 is a well-calibrated building based on mathematically well-defined techniques.

To attain a well-calibrated building, the relevant corrective heat flows 160 are applied to the simulator 110. When using the calibrated simulator 110 to extrapolate to other periods and/or for other variables, the calibrated simulator 110 is preferably executed with the corrective heat flows 160 as additional inputs 114. After the simulator is executed, the new outputs 116 are used to tune one or more of the primary flows 335 and therefore the corresponding corrective heat flows 160. The simulator 110 is then re-executed with new corrective heat flows 160. Feedback arrow 150 represents this iterative process. Iterations can then be continued until the analysis indicates that the simulated values 140 have converged satisfactorily. Such analysis will be explained in greater detail hereinbelow. It should be reiterated here that a total building calibration (including an HVAC system calibration) is made possible, at least in part, because of the shell calibration parameter δs.

By way of further explanation, the calibrated simulator may be used to extrapolate under thermostatic constraints. The output of such a simulation is inside temperature(s) and energy use to maintain thermostatic constraints. (The inside temperature(s) are not necessarily equal to the thermostatic set-point for that hour.) The inside temperature(s) of the building affect the calculation of the corrective heat flows 160. Consequently, iterations can be used to achieve a desired level of convergence. (In general, iterations are useful when (at least some of) the inputs depend on (at least some of) the outputs.) The inside temperature(s) are selected as the simulator output when, for example, an extrapolation into the future is performed; the inside temperatures were not measured; or the inside temperatures were measured, but it is desirable to compare the simulated inside temperatures with the measured inside temperatures. These inside temperatures affect the determination of heat flows, which in turn affect the calculation of the corrective heat flows 160, as will be explained more fully hereinbelow. Thus, iterations are useful to tune the corrective heat flows. In contrast, a calibrated simulation may be used to extrapolate for energy consumption with measured inside temperatures. For example, extrapolation for the month of April may be performed with a March-calibrated building. The adequacy of the calibration of the building simulation may therefore be subsequently confirmed. Because the output (e.g., the energy consumption) does not affect the primary heat flows, and thus the corrective heat flows (in one embodiment), iterations are not normally needed.

Figure 2A:
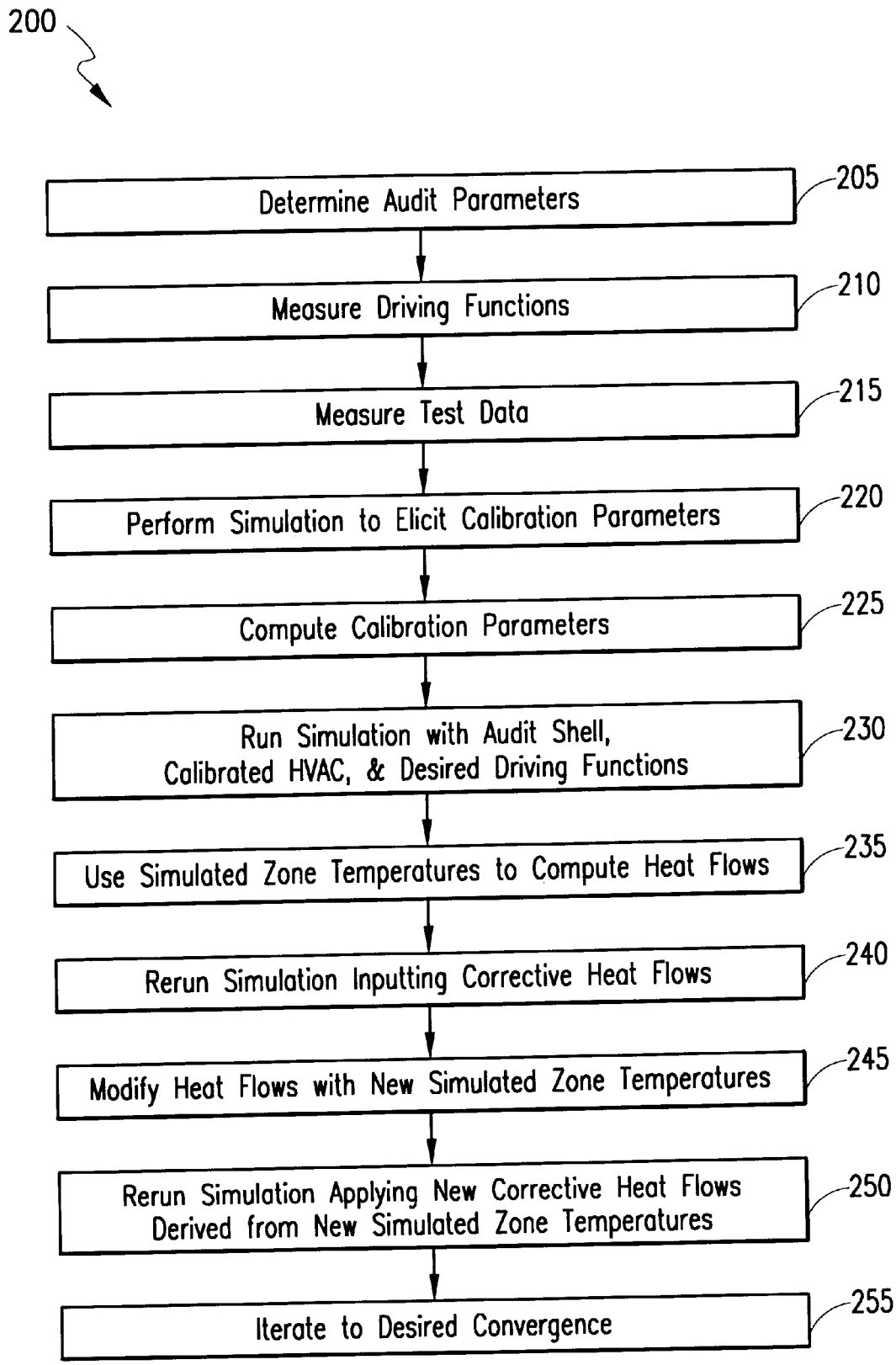
FIG. 2A illustrates a method for determining and applying corrective heat flows to a simulator according to a preferred embodiment of the present invention.
Figure 2B:
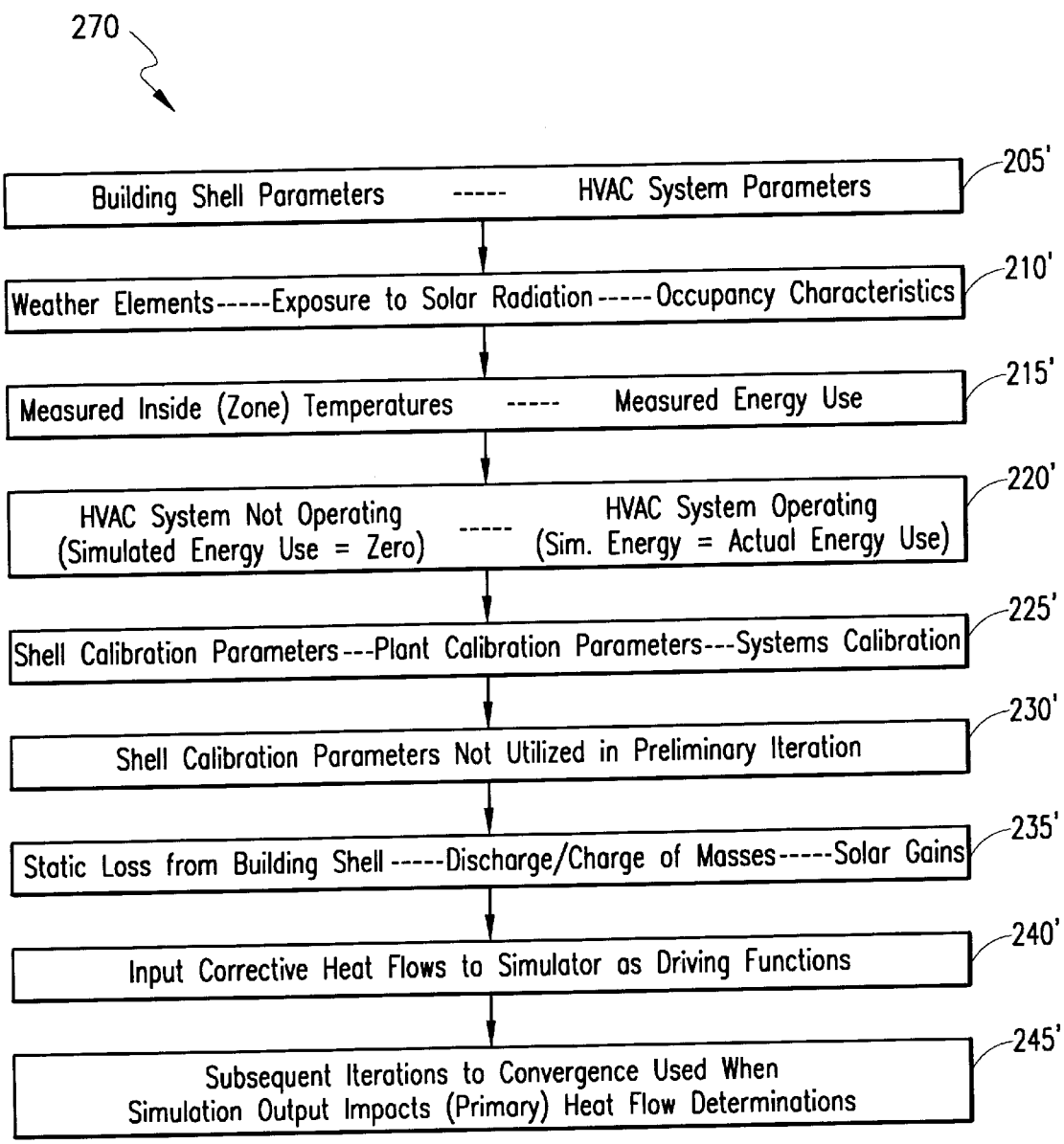
FIG. 2B illustrates additional exemplary aspects of the method for determining and applying corrective heat flows to a simulator in accordance with the present invention.

Referring now to FIG. 2A, a method for determining and applying corrective heat flows to a simulator according to a preferred embodiment of the present invention is illustrated. The method is described in a preferred, approximately chronological order for increased clarity. FIG. 2B illustrates additional aspects of the method of FIG. 2A and will be described subsequent to the detailed description of FIG. 2A. Specifically, FIG. 2B serves to explain in greater depth exemplary possibilities for each step of FIG. 2A. Steps 205–225 are part of the calibration phase of the invention. Steps 230–255 are part of the extrapolation phase (e.g., the application of the calibrated simulator to produce desired data such as fuel use) of the present invention. Steps 245–255 are part of an iterative procedure that is used in a preferred embodiment when the inside temperature(s) are output from the calibrated simulation. Steps 245–255 are not required in a preferred embodiment if the simulation is performed with measured inside temperature(s). In general, Steps 245–255 are performed whenever an output of the simulator 110 can affect the calculation of the corrective heat flows 160. Thus, the applicability of the iterative aspect of the extrapolation phase depends, at least in part, on the variables used to determine the primary heat flows, as will become clear after reading and understanding the principles of the present invention.

The flowchart 200 in FIG. 2A begins with the determination of audit parameters (step 205) for the building under study. The measured driving functions (e.g., driving function inputs 130) also must be determined (step 210). In order to acquire test data, measurements are preferably made of certain variables, some of which are to be simulated, of the building under study (step 215). These test data variables, and any other variables of interest, are measured during a test data period along with possibly the corresponding driving function inputs 130. The building is preferably configured into different data windows during the test data period so that certain parameters can be elicited from that period. For example, the HVAC system can be turned off during a portion of the test data period; therefore, the inside temperature is allowed to float based primarily on the driving functions and the building shell.

An operator instructs the simulator 110 to perform a simulation designed to elicit the desired calibration parameters (step 220). During this (or these) simulation(s), the simulated values can be compared to measured ones. If they match sufficiently, then no calibration is necessary. Usually, however, they do not match sufficiently. Hence, the simulator 110 can be improved with calibration. The simulator 110 is calibrated by computing calibration parameters (step 225), preferably within different data windows. Each data window is preferably established such that a particular calibration parameter (or set of parameters) can be determined therein.

Two types of sets of calibration parameters are, for example, shell calibration parameters and HVAC calibration parameters. With respect to determining shell calibration parameter δs, a shell calibration parameter δ is associated with each of the primary flows 335 (from FIGS. 3B and 3C, as described further hereinbelow). It should be understood that the primary flows 335 are preferably primary heat flows. Moreover, primary flows 335 are preferably flows that contribute predominantly to the energy balance of the building. (They are also preferably unmeasured heat flows to warrant the application of corrective parameters.) With respect to determining HVAC calibration parameters, a data window in which the HVAC system is operating is preferably utilized so that the HVAC parameters may be determined through a best fit to the measured energy use. Continuing with the determination of the shell calibration parameter $\delta s$, a data window in which the HVAC system is not operating is preferably utilized so that the shell calibration parameter $\delta s$ may be determined through a best fit to measured energy use of zero. The sum of the products of each calibration parameter $\delta$ and its associated primary flow 335 (along with other potential variables as explained in greater depth hereinbelow in conjunction with two examples) is best fit to zero. From this best fit to zero, the calibration parameters $\delta$ are determined. The products of each calibration parameter $\delta$ and its associated primary flow 335 are then input into the simulator 110 as corrected heat flows 160. The modified HVAC parameters are likewise input into the simulator 110.

Application of these corrections (e.g., the corrective heat flows along with the HVAC calibration parameters) results in a calibrated building simulation. This concludes the calibration phase of the invention. The extrapolation phase (application of the calibrated simulation) begins by running the simulation in a preliminary iteration with (i) the building shell audit values 122, (ii) the calibrated HVAC values (e.g., adjusted HVAC system values incorporating the HVAC calibration parameters 350 (of FIGS. 3B and 3C)), and (iii) the relevant driving functions inputs 130 (step 230). From this preliminary iteration, the simulated zone temperatures 144 are computed. These simulated zone temperatures 144 can then be used to compute the primary flows 335 (step 235).

The corrective heat flows 160 are then computed by calculating the product of each of the calibration parameters $\delta$ (from step 225) with its associated primary flow 335 (as determined in step 235). The simulator 110 is then rerun in a first iteration with the corrective heat flows 160 as inputs (step 240). New simulated zone temperatures 144 are produced. These new simulated zone temperatures 144 are then used to modify the calculated values of the primary flows 335 (step 245). This serves to refine the values of the primary flows 335. The calibration parameters $\delta$ are then multiplied by the new values for the primary flows 335. This produces tuned values of the corrected heat flows 160, which are then input into simulator 110. Simulator 110 is then rerun in a second iteration with these tuned values of the corrected heat flows 160 (step 250). This iterative process is then repeated until a desired level of convergence of the zone temperature(s) is reached (step 255). The extrapolation phase of the invention is then complete.

FIG. 2B, which illustrates additional aspects of the method of FIG. 2A by explaining in greater depth exemplary possibilities for each step of FIG. 2A, will now be described. The flowchart 270 in FIG. 2B illustrates two exemplary audit parameters for determination (corresponding to step 205 of FIG. 2A). For example, the building shell parameters (e.g., building shell audit values 122 of FIG. 1) need to be determined (step 205'). Additionally, the HVAC system parameters (e.g., HVAC system audit values 124) need to be determined (also step 205'). The measured driving functions (of step 210) can include weather elements 132 (step 210'); solar radiation 134 (also step 210') (the solar radiation 134 can alternatively be incorporated into the weather file); and occupancy characteristics (also step 210'), which can be considered one of the general driving functions 138. Occupancy characteristics account for, for example, the heat input due to people, equipment such as printers and computer monitors, and lighting.

Test data is preferably measured with respect to the building under known conditions (step 215). Examples of such test data variables include measured inside (zone) temperatures (step 215') and measured energy use 365 (step 215'). When a simulation is performed to elicit calibration parameters (step 220), the simulation is performed with both the HVAC not operating and with the HVAC operating (step 220'), which correspond to the relevant data-windowing segments during the test data period. If a simulator 110 is already well-calibrated, then the simulated energy use will be zero (step 220') during the segment of HVAC non-operation and the simulated energy use will equal the actual energy use (step 220') during the period of HVAC operation. Usually, these two conditions (from step 220') are not sufficiently met. Hence, the simulator 110 can be improved with calibration.

The calibration parameters are computed next (step 225). The shell (Load) calibration parameters (step 225') are computed in the context of the primary flows 335 of the subject building, preferably from the nonoperative-HVAC portion of the test data period. Corrections to the HVAC parameters (as combined from Plant and System parameters) (step 225') are preferably made from the operative-HVAC portion of the test data period, as will be explained further hereinbelow. Advantageously, the method and apparatus of the present invention enables these parameters to be calibrated in the context of an entire building calibration. In addition to HVAC operating and nonoperating data windows, many other data windows can be utilized depending on the desired variable, as will be apparent to one of ordinary skill in the art after reading and understanding the principles of the present invention. For example, data windowing during night hours reduces the effect of a solar radiation primary heat flow.

After completing the calibration phase, the extrapolation phase may be executed to attain a prediction of performance. As explained hereinabove, a preliminary simulation iteration is performed (step 230). In this preliminary iteration, the computed calibration parameters $\delta$ are not utilized (step 230'). The simulated zone temperature(s) from the output of the preliminary simulation iteration are used to compute primary flows (step 235). Exemplary primary flows 335 are (from step 235'): static loss from the building shell, the discharge/charge of masses due to inside temperature variations, and the solar gains by the air node from transparent as well as opaque surfaces. (The solar gain primary heat flow does not depend on the simulated zone temperatures 144; therefore, the corrective solar gain heat flow may be optionally included in the preliminary iteration.)

The simulation is rerun with the corrective heat flows as inputs (step 240). These corrective heat flows 160 are preferably included in the internal gains (such as heat gains due to people, appliances, and lighting) and so may be directly input into the simulator 110 as if new values of driving functions are presented (step 240'), thus enabling the use of any general (including, a commercial or public domain) simulator. As explained hereinabove, subsequent iterations may be performed to achieve a desired level of convergence (steps 245–255). It should be noted that such subsequent iterations are preferably implemented whenever the output(s) of the simulator 110 impact (e.g., affect the calculation of) the heat flows (step 245').

Figure 3A:
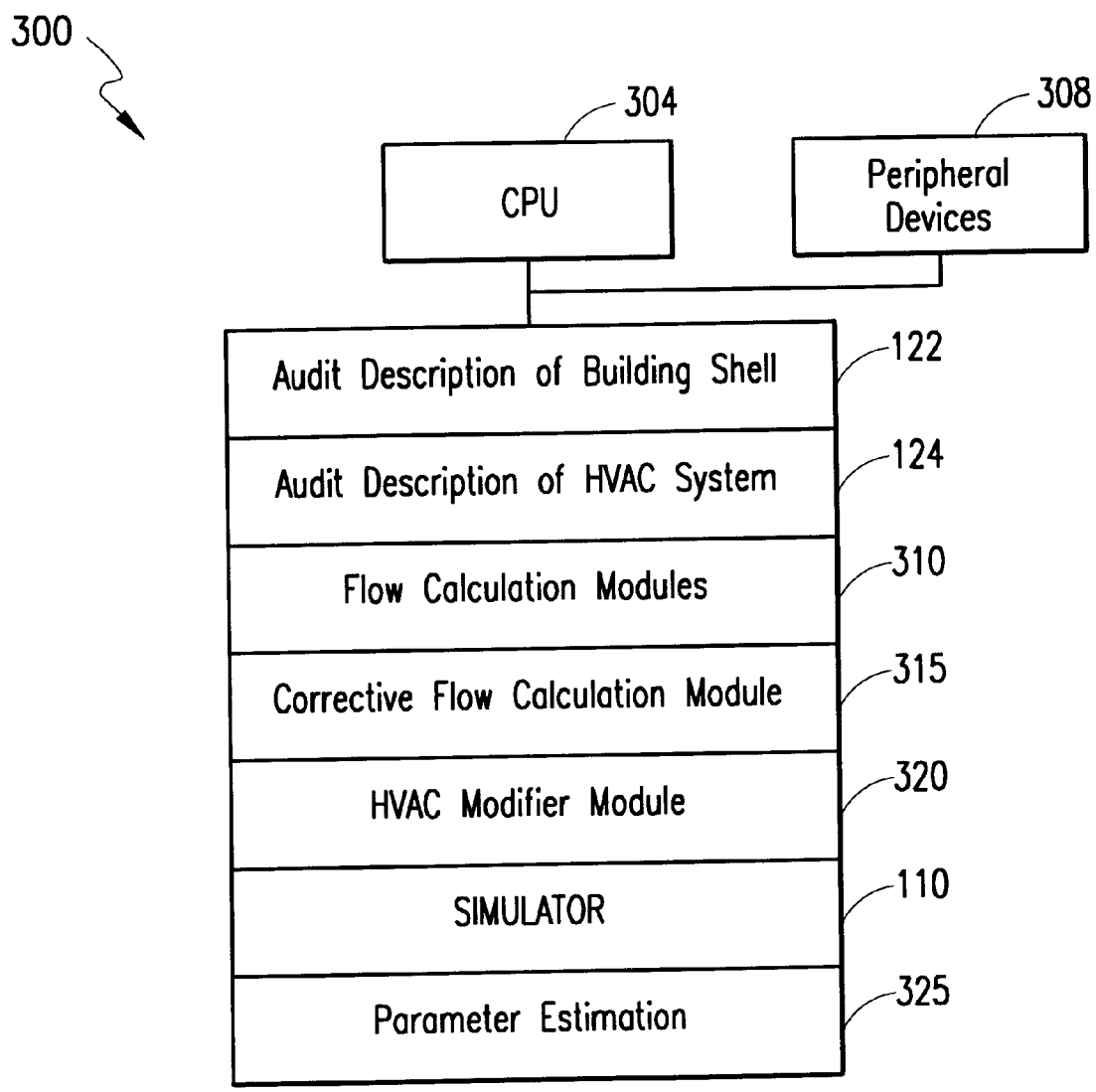
FIG. 3A illustrates a block diagram of a system with a general purpose computer programmed to operate in accordance with the present invention.
Figure 3B:
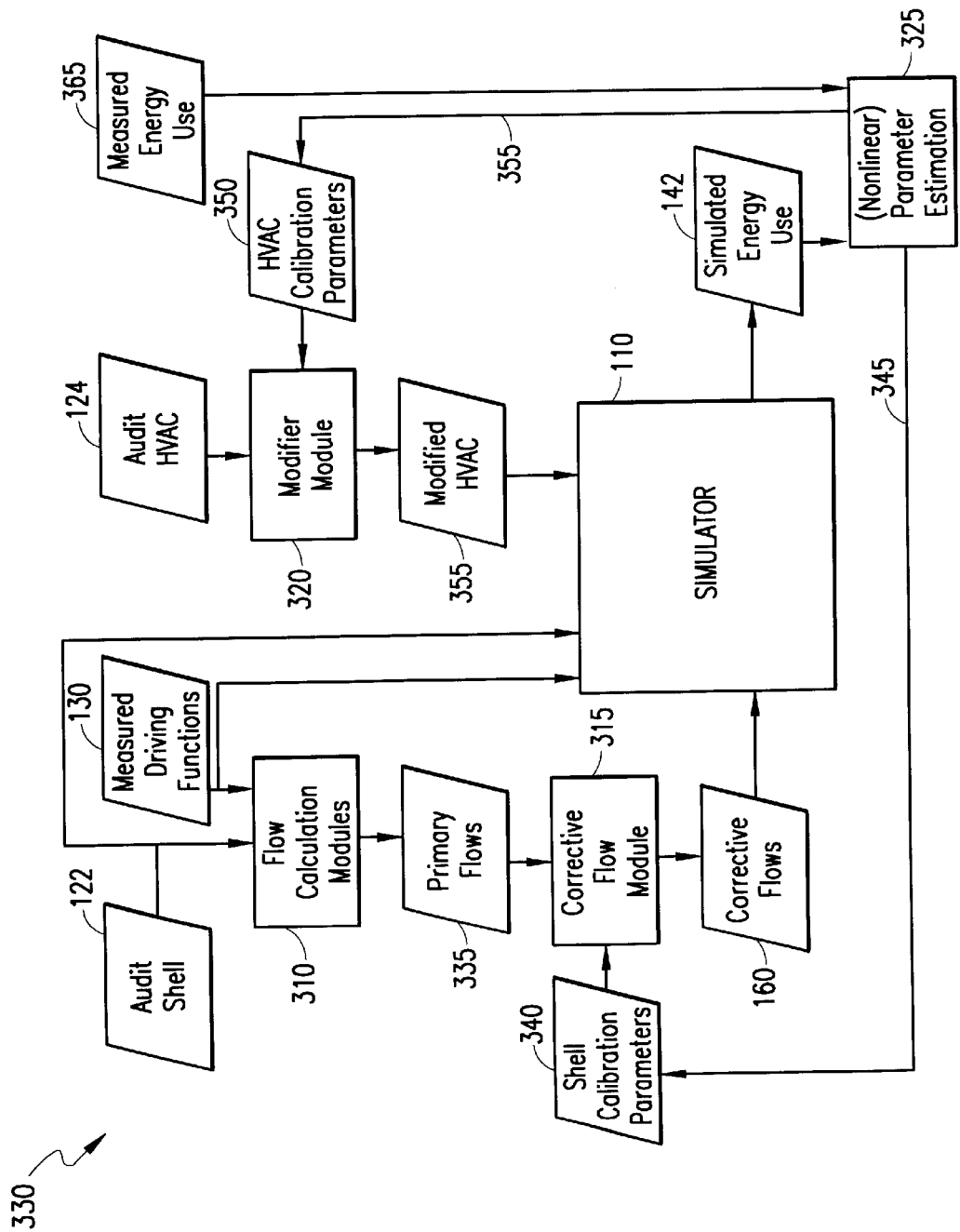
FIG. 3B illustrates a flow diagram depicting the primary steps associated with the estimation of parameters, as can be executed on the general purpose computer in FIG. 3A.
Figure 3C:
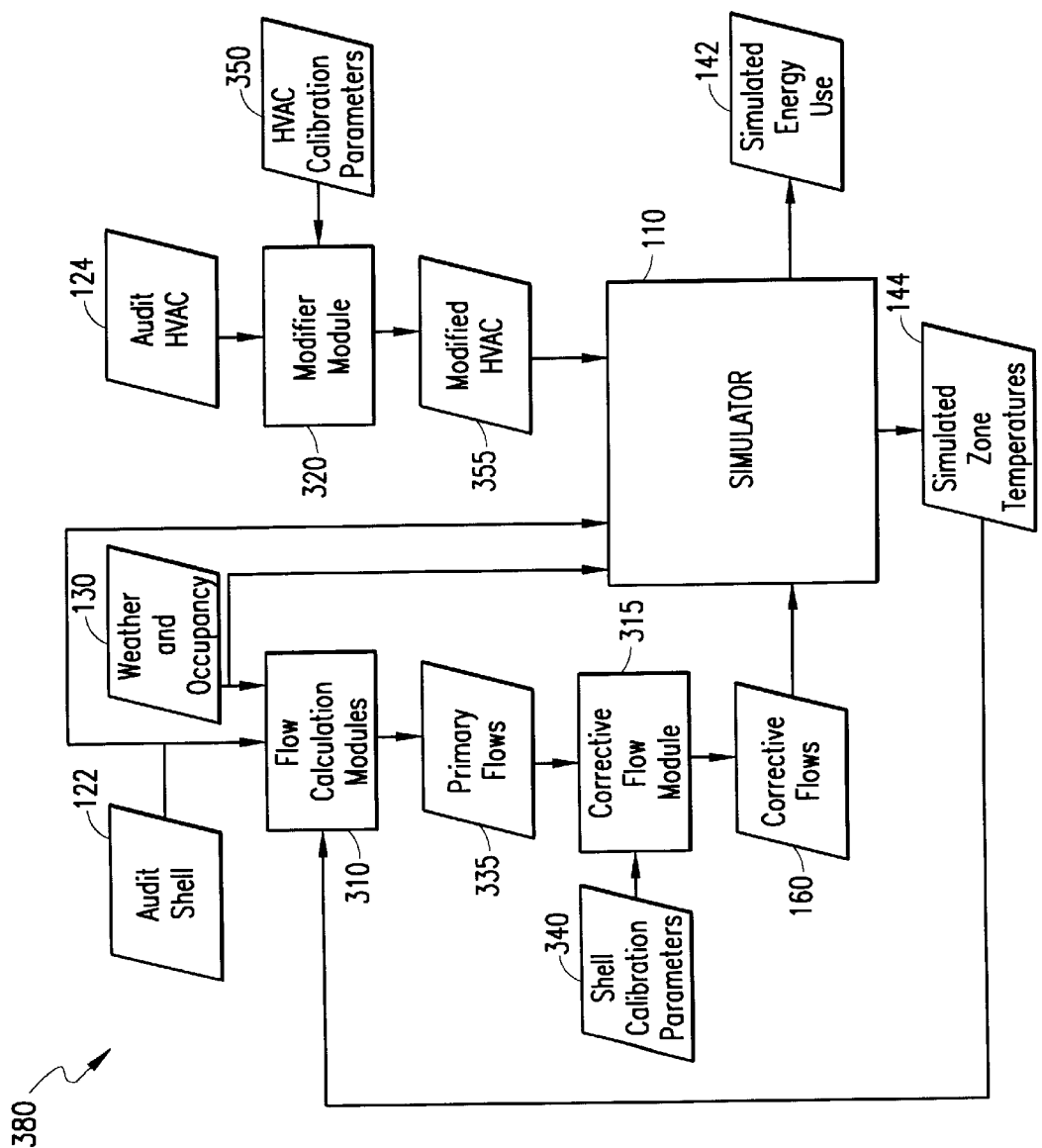
FIG. 3C illustrates a flow diagram depicting the primary steps associated with the simulation of long-term performance, as can be executed on the general purpose computer in FIG. 3A.

A preferred embodiment of the overall apparatus is shown in the form of a block diagram in FIG. 3A, which illustrates a system with a general purpose computer 300 programmed to operate in accordance with the present invention. A CPU 304 may be any general purpose or specially optimized processor. The general purpose computer 300 also includes an associated mother board (not pictured) for communication with peripheral devices 308. The peripheral devices 308 can include, for example, disk storage devices for storing programs and data for the simulator-calibrating invention, input devices such as a keyboard or network interface card for entering data, and display devices such as a printer or monitor for outputting results from the inventive procedure. Such results may also be stored directly in or on volatile or non-volatile memory.

The inventive procedure can be effectuated on any general purpose computer. Also, although the procedure of the present invention is preferably implemented in software, it can also be implemented in hardware, firmware, etc. When the invention is implemented in software, the software can be stored in any type of computer-accessible memory, e.g., volatile or nonvolatile, solid-state or not, fixed or removable media, etc. Also, the memory can be, e.g., RAM, ROM, EEPROM, magnetic, optical, DVD, etc. It should be noted that the building energy simulation calibration of the present invention has a myriad of practical applications. To wit, the calibration technique can be used to optimize the results from any building energy simulator to thereby provide more-accurate optimal control.

Continuing with FIG. 3A, several units are preferably stored in a memory area(s) of the general purpose computer 300. The units may be within one memory area or distributed between or among two or more memory areas. For example, the module units (310, 315, and 320) and the simulator 110 may be stored in a hard drive (which may be represented by peripheral devices 308) while the description units (122 and 124) may be on a floppy disk in a floppy drive (which may also be represented by peripheral devices 308). Furthermore, the simulator, the module units, the description units, etc. may all be stored (especially during a simulation) in a volatile RAM (not pictured).

Specifically, two data units, an audit description of the building shell 122 and an audit description of an HVAC system 124, provide information regarding the physical aspects of the relevant building. Three software modules are important to the calibration technique: flow calculation modules 310, a corrective flow calculation module 315, and an HVAC modifier module 320. The functions and interrelationships of these modules will be described hereinbelow in conjunction with FIGS. 3B and 3C and further explained with two examples. Any general simulator program is represented by the simulator 110, and parameter estimation code 325 (e.g., a least-squares best-fit-to-zero processing unit) is also shown. As explained above, these several units may be singularly or distributively located, for example, in the RAM of the general purpose computer 300, on a removable storage medium such as a floppy, or in a fixed storage medium such as a hard disk drive.

Referring now to FIG. 3B, a flow diagram 330 depicts a set of presently-preferred primary steps associated with the estimation of calibration parameters (e.g., the calibration phase), as executed on the general purpose computer 300 in FIG. 3A. The simulator 110 is illustrated receiving inputs and producing outputs as indicated by various flow arrows. The audit shell inputs 122 are input directly into the simulator 110 and also into the flow calculation modules 310. The flow calculation modules 310 also receive as inputs the measured driving functions 130. From the outputs of the flow calculation modules 310, the primary flows 335 are identified (e.g., the heat flows that dominate the energy balance of the building). The primary flows 335 are input into the corrective flow module 315. The corrective flow module 315 also receives shell calibration parameters 340. From the primary flows 335 and the shell calibration parameters 340, the corrective flow module 315 produces corrective flows 160, which are directly input into the simulator 110 as if new values of driving functions are presented, thus enabling the use of any general (including, a commercial or public domain) simulator.

The audit HVAC inputs 124 are input into the HVAC modifier module 320. The HVAC modifier module 320 also receives as inputs the HVAC calibration parameters 350 and produces the modified HVAC values 355. These modified HVAC values 355 are directly input into the simulator 110 (by, for example, substituting the modified HVAC values 355 for the audit HVAC inputs 124). Another input to the simulator 110 for this preferred embodiment is the measured driving functions 130. The simulator 110 can then perform a simulation to produce the simulated energy use 142. The simulated energy use 142, together with the measured energy use 365, can be used to complete the (nonlinear) parameter estimation with the parameter estimation module 325. One exemplary nonlinear technique is least squares. The estimated parameters are then output to the shell calibration parameters 340 and the HVAC calibration parameters 350.

To clarify the outputting of the estimated parameters to the shell calibration parameters 340 and the HVAC calibration parameters 350, the data windowing process to elicit the calibration parameters should be explained in the context of FIG. 3B. If data windowing can be performed such that segments exist for both HVAC operating and non-operating, then the shell calibration parameters may be computed linearly and therefore feedback iterations 345 are not required. Determination of the HVAC parameters, on the other hand, is almost always a non-linear process requiring iterative feedback loops as represented by arrow 355. If data windowing cannot be performed for HVAC operating and non-operating segments, then both the HVAC and the shell calibration parameters may be estimated simultaneously. In this instance, feedback iterations for the shell calibration parameters, as represented by the arrow 345, are ordinarily required to compute the parameters simultaneously.

Referring now to FIG. 3C, a flow diagram 380 depicts the presently-preferred primary steps associated with the simulation of performance under various conditions (e.g., the extrapolation phase), as executed on the general purpose computer 300 in FIG. 3A. The simulator 110 is illustrated receiving inputs and producing outputs as indicated by various flow arrows. The audit shell inputs 122 are input directly into the simulator 110 and also into the flow calculation modules 310. The flow calculation modules 310 also receive as inputs the measured driving functions 130 (which include weather and occupancy-related data). The primary flows 335 are output from the flow calculation modules 310 and input into the corrective flow module 315. The corrective flow module 315 also receives shell calibration parameters 340. From the primary flows 335 and the shell calibration parameters 340, the corrective flow module 315 produces corrective flows 160, which are directly input into the simulator 110 as if new values of driving functions are presented.

The audit HVAC inputs 124 are input into the HVAC modifier module 320. The HVAC modifier module 320 also receives as inputs the HVAC calibration parameters 350 and produces the modified HVAC values 355. These modified HVAC values 355 are directly input into the simulator 110 (by, for example, substituting the modified HVAC values 355 for the audit HVAC inputs 124). Another input to the simulator 110 for this preferred embodiment is the measured driving functions 130 (which include weather and occupancy-related data). The simulator 110 can then perform a simulation to produce the simulated energy use 142 and the simulated zone temperatures 144. If simulated zone temperatures 144 are produced, then they are fed back into the simulation process (as is indicated in FIG. 1 by feedback arrow 150) as inputs to the flow calculation modules 310 in an iterative process. This feedback process enables the fine tuning of the primary flows 335. The simulator 110 is then re-executed to produce a better set of simulated zone temperatures 144. This iterative process continues until an acceptable convergence is achieved, e.g., the rate of change from a prior iteration to a subsequent iteration is low or zero.

Two examples are provided hereinbelow both to highlight the simulator-independence of the present invention as well as to illuminate the principles of the present invention by demonstrating the calculation and use of corrective flows in practical examples. The first example is with DOE-2.1E as the simulator for a one-zone building while the second example is with STEM as the simulator for a six-zone building. Both examples deal with heating season performance. The preferred exemplary test protocol consists of a first period during which the heating system is turned off and any heating is performed electrically and a second period when the heating system is activated.

The method and apparatus are applicable, with suitable modifications derivable by one of ordinary skill in the art from the general description and the specific examples, for calibrating the cooling season performance, as well as to encompass situations where the heating/cooling system is not turned off during any part of the data period. Hourly data are used in both examples. The method and apparatus are also applicable, with suitable modifications derivable by one of ordinary skill in the art from the general description and the specific examples, for other data (e.g., data from utility bills).

In the first example, the calibrating method and apparatus of the present invention is described in the context of the DOE-2.1E simulator. The DOE-2.1E simulator is applied to a single-zone building, i.e., a building in which the interior temperature is sufficiently uniform to be considered the same in all conditioned spaces. The building is conditioned by a two-pipe fan coil unit with a gas-fired hot-water boiler. This first example uses ersatz data to best explain the invention.

Figure 4:
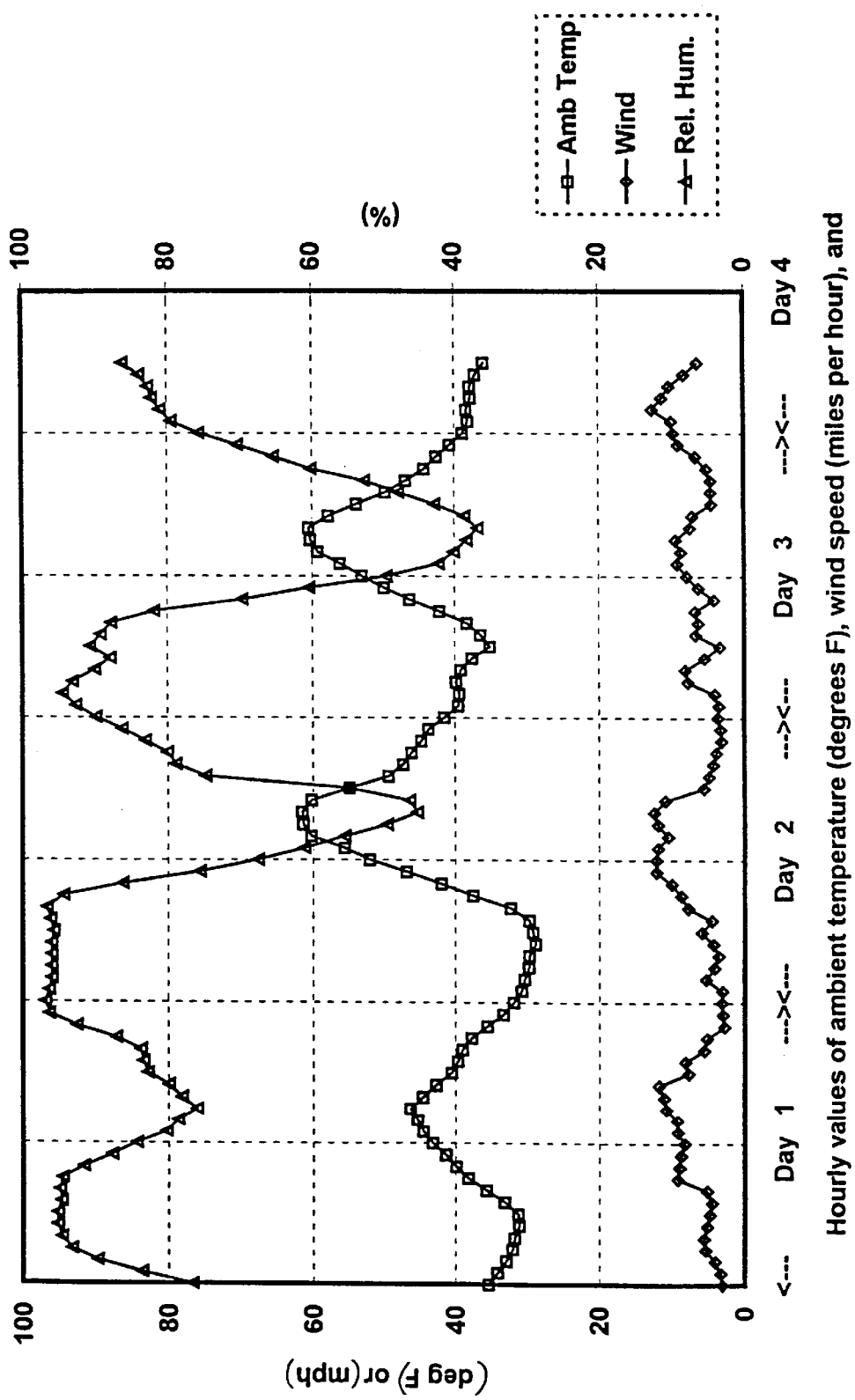
FIG. 4 illustrates hourly values of ambient temperature, wind speed, and ambient relative humidity during the relevant test period for two buildings.
Figure 5:
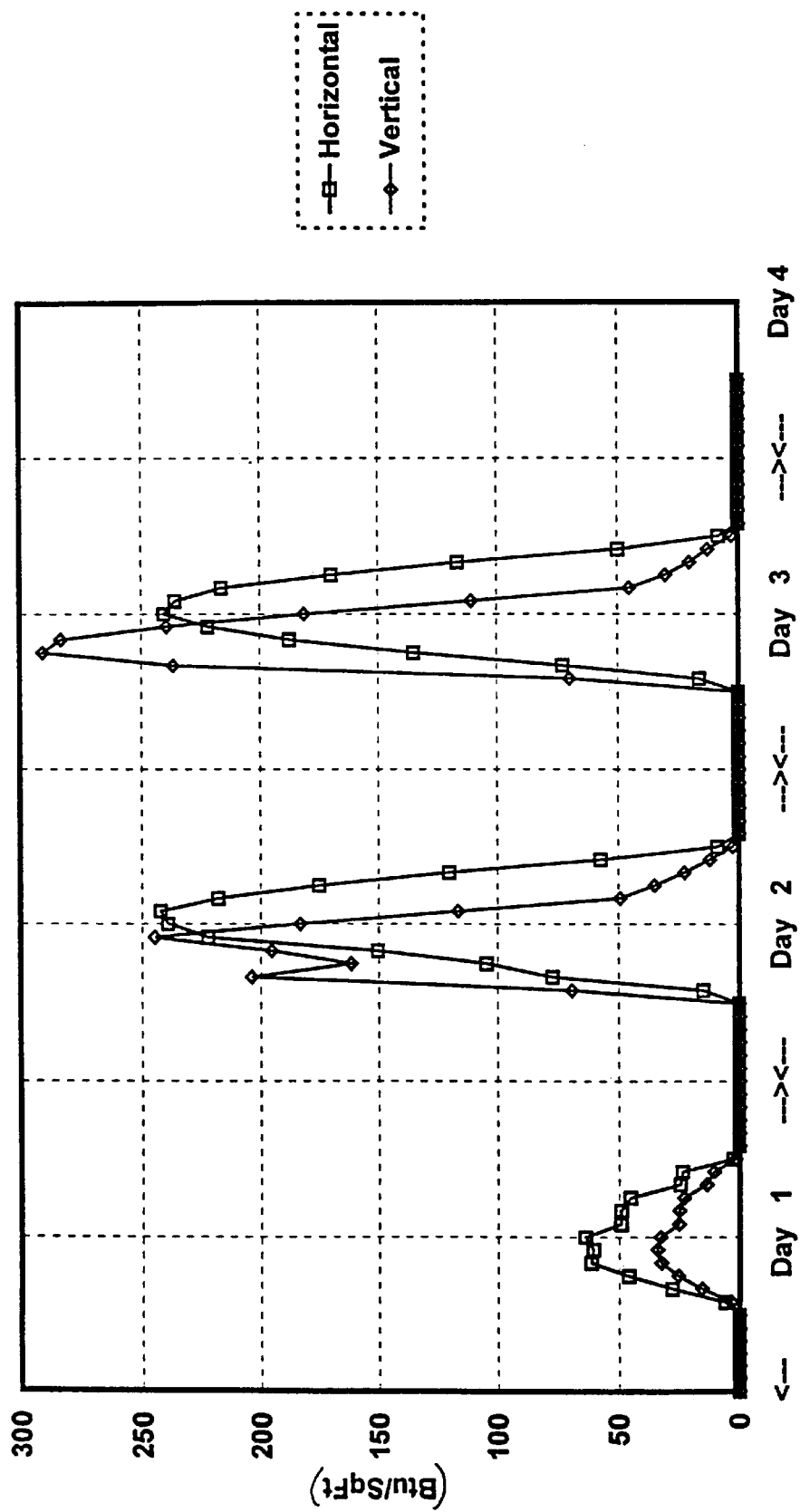
FIG. 5 illustrates hourly values of solar radiation measured by two pyranometers—one horizontal and one vertical parallel to the primary glazing orientation of the two buildings.
Figure 6:
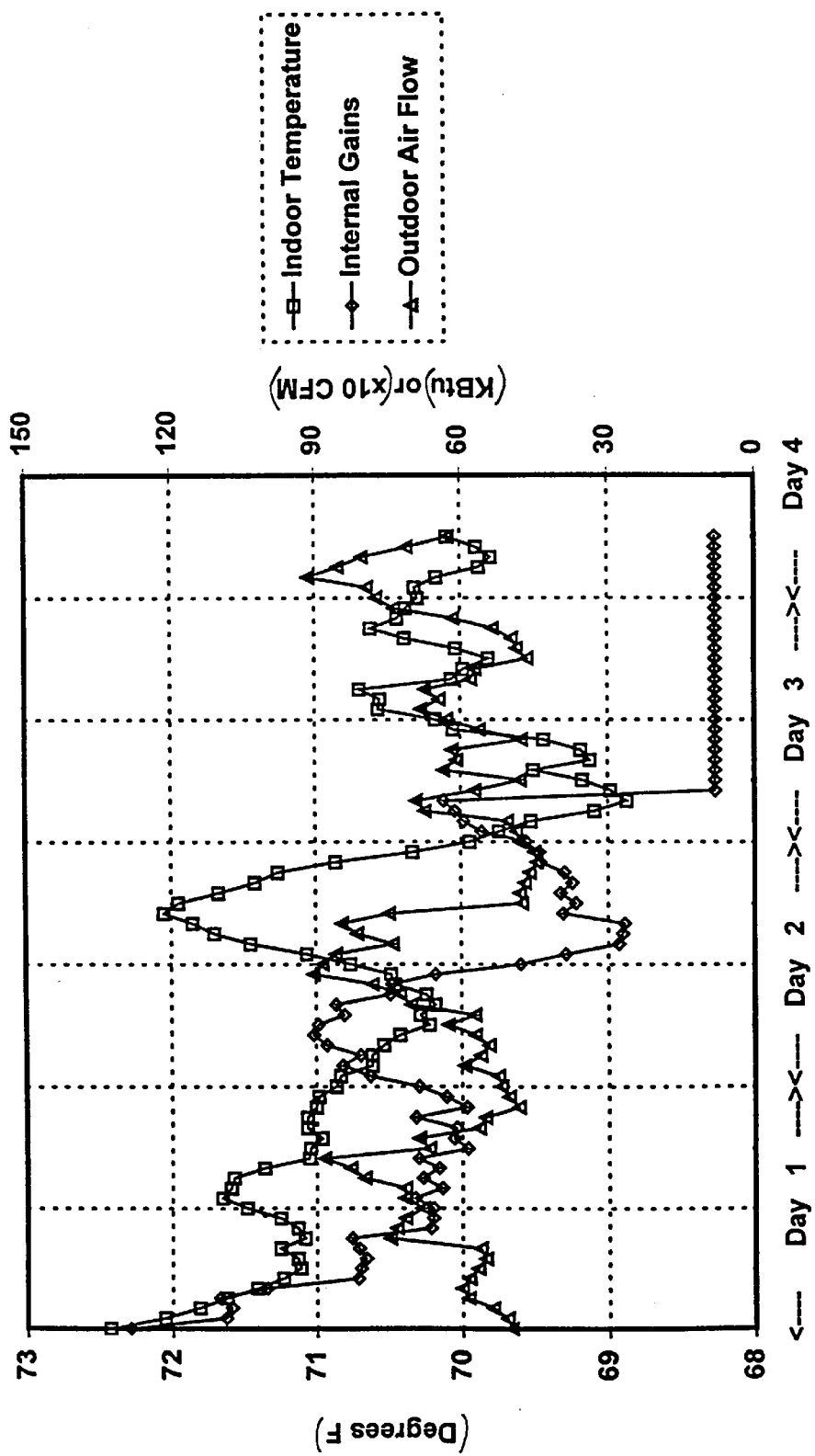
FIG. 6 illustrates indoor temperature, internal gains, heat flow from infiltration/ventilation, and gas use during the test period for an exemplary building for a DOE-2.1E calibration.

Measured data refers to data that is (or would be) measured in a real building. The measured data is for the period "Day 65" (of some year) Hour 1 to "Day 68" Hour 7. "Day 65" to "Day 68" will be referred to hereinbelow and in the FIGURES as Day 1 to Day 4, respectively. The measured data consist of indoor temperature; ambient temperature and relative humidity; solar radiation on a horizontal surface, as well as a vertical surface facing approximately south; wind speed; and electricity and gas used. The HVAC system fan is on during the entire test period. The test protocol in this first example is such that the boiler heat, on the other hand, was used only during the period Day 3 Hour 5 to Day 4 Hour 7. No other source of heating or cooling is operating during the test data period. FIGS. 4, 5, and 6 illustrate plots of the data during the test period.

Referring now to FIG. 4, hourly values of ambient temperature, wind speed, and ambient relative humidity from Day 1 Hour 1 to Day 4 Hour 7 for the buildings of the two examples are illustrated. For this first example, the values apply to the single-zone building. Referring now to FIG. 5, hourly values of the solar radiation that impacts the buildings of the two examples and that are measured by two pyranometers are illustrated. One pyranometer detects in the horizontal direction, and another pyranometer detects in the vertical direction parallel to the primary glazing orientation. Referring now to FIG. 6, indoor temperature, internal gains, and heat flow from infiltration/ventilation during the test data period for the building of the first example is illustrated. Outside air introduced into the building during the test data period (due either to infiltration or ventilation) is measured with tracer gas and illustrated in FIG. 6.

Continuing with the first example, a DOE-2 model of the building is derived from an audit. A weather file is then created using the measured data quantities. (The measured radiation is first converted to global horizontal and direct normal radiation as required by the simulator.) The measured outside air and electrical energy use are also input into the simulation through schedules. (These procedures and FIGS. 4–6 correspond to steps 205–215 of FIG. 2.)

Analysis begins with the period when the heating system is inactive (Day 1 Hour 1 to Day 3 Hour 5). In a first embodiment, a simulation is performed that allows the building temperature to float (this can be accomplished with low heating set-points and high cooling set-points). If the simulated indoor temperatures are sufficiently close to the measured indoor temperatures, no calibration of the DOE-2 model is needed. Alternatively, in a second embodiment, a simulation can be performed by scheduling the indoor temperatures to be the measured temperatures. If the simulated heating/cooling requirements are sufficiently close to zero, no calibration is necessary. Usually, calibration is required. The calibration can proceed either by requiring the simulated temperatures to be close to the measured temperatures in the former (first embodiment) case or by requiring the simulated heating/cooling requirements to be close to zero in the latter (second embodiment) case. A currently preferred approach is the second embodiment. (Performing the simulation corresponds to step 220.)

It should be understood that a simulator such as the DOE-2 may treat some fraction of the electrical equipment gains as convectively coupled to zone air and the remaining gains as radiatively coupled to masses. Electrical energy from fans (with proper allowance for motor placement) shows up as heat gains in the zone air. If part of the electrical equipment gains are due to "normal" equipment and part are due to fans, the appropriate equivalent gains are preferably determined to account for the instantaneous gains portion. The appropriate equivalent gains can be determined in DOE-2 by using the custom weighting factor relationship. A preferred embodiment in the context of DOE-2.1E is as follows: specify SUM as the system (this is the DOE-2.1E technique to determine Loads under thermostatic constraints) and explicitly deal with the fan energy. The electrical energy specified in the graphs has been adjusted to provide the proper amount of fan energy as instantaneous gains by zone air. Alternatively, the actual system (a two-pipe fan-coil in this example) can be specified, and the appropriate amount of fan energy can be input. This approach, however, has the disadvantage that if the simulation of the audit building requires cooling to maintain the specified indoor temperature (e.g., because the audit solar gains are too large), the system needs to artificially enter cooling mode. Otherwise, the indoor temperature may rise significantly above the measured temperature.

Continuing with the second embodiment of the first example, the simulator computes the heating/cooling to be provided to conform to the thermostatic constraints, which, in this case, is to maintain measured inside temperature(s). In a DOE-2 simulation, even when SUM is specified as the system, the thermostatic constraint (e.g., heating set-point equal to the cooling set-point equal to the measured temperature) is not strictly maintained. Thus, the simulated temperatures show some deviation from the measured temperatures. Adjustments are therefore made to determine what the heating/cooling Loads would have been had the simulation maintained the indoor temperatures to be the measured temperatures. These adjustments are necessary before performing a calibration per se. Because these adjustments are not large, suitable approximations can be developed. The adjustments for the DOE-2 simulation can be viewed as arising from: the load coefficient times inside-outside temperature difference, the charging/discharging of masses due to indoor temperature variations, and infiltration/ventilation heat loss. The first happens to follow the same process as computing the term "$-L[T_{in}-T_{out}]$" (as explained below). The second happens to follow the same process as the term "$Q_{in,storage}$" (also explained below). And the last adjustment involves a simple calculation knowing the air flow. It should be understood that these particular adjustments are specific to DOE-2 and DOE-2-type simulators. Other simulators may require different adjustments. As noted above, such adjustments are not necessarily a required part of the calibration method and apparatus per se of the present invention; these adjustments are simulator-dependent.

The net result of these primary heat flows is denoted "$Q_{audit,net}$", which represents the heating/cooling requirement for maintaining the audit building at the measured temperatures. By convention, a positive $Q_{audit,net}$ implies a heating requirement, and a negative $Q_{audit,net}$ implies a cooling requirement. The calibration problem for this data period can now be thought of as introducing certain parameters and estimating them to make $Q_{audit,net}$ as close to zero as possible for all hours of the analysis period. Least squares is a preferred criterion for defining closeness to zero.

Instead of directly modifying the inputs, the input discrepancies can be viewed as resulting in corrections needed for various heat flows. The parameters are introduced as follows: Perform an analysis of the heat flows contributing to energy balance. Identify the primary flows 335. Only the primary flows 335 will contribute to corrective flows and therefore need to be computed (and the secondary flows as already incorporated in $Q_{audit,net}$ will not be modified). As noted hereinabove, these primary heat flows are determined from the outputs of the flow calculation modules 310. Other examples of heat flows that may or may not be considered primary (e.g., a dominant factor in the energy balance of the building under test) are a heat flow due to sky temperature depression and a heat flow due to outside temperature variation. Additional heat flows will be present, some of which may be dominant (primary) and some of which will be secondary, tertiary, etc. A rough procedure of identifying the magnitudes of the heat flows is sufficient. (This will also be facilitated by experience with similar buildings.) As an example, after calculating heat flows through a procedure such as PSTAR, the larger (and unmeasured) heat flows are preferably identified as primary. The below-listed three primary flows are typical of many buildings and have therefore been selected for the two examples. It should be noted that identification of the primary heat flows may be possible without explicit calculation based on experience.

The exemplary primary flows 335 are represented algebraically as follows:

$-L[T_{in}-T_{out}]$ The static loss from the building shell (excluding infiltration) due to inside and outside temperature difference. (L is the building load coefficient; $T_{in}$ is the indoor temperature; and $T_{out}$ is the outdoor temperature.)

$Q_{in,storage}$ The discharge/charge of masses due to inside temperature variations.

$Q_{sun}$ The solar gains by the air node from transparent as well as opaque surfaces. The effect of charging/discharging of masses is included.

Computing the first of the above-listed three primary flows is straightforward. The term "$-L[T_{in}-T_{out}]$" can be computed from the measured values of $T_{in}$ and $T_{out}$, if L is known. The quantity L can be computed directly from the building description, or it can be computed through the simulator by performing a simulation with constant $T_{in}$, with constant $T_{out}$, and by disabling all other features such as solar gains. The resulting heating/cooling load is equal to $-L[T_{in}-T_{out}]$, from which L can be determined. (Wind effects, and in some simulators temperature dependence of film coefficients, may make this quantity somewhat variable. A constant value appropriate for typical conditions is quite suitable to compute this corrective term. Such approximations may be necessary for all the corrective terms.)

The second term, "$Q_{in,storage}$", can be computed by combining the measured values of $T_{in}$ and transfer functions. The zone transfer functions are determined through a transfer function fitting at selected frequencies (simple variations of this method are possible to fit over a larger number of frequencies in the least square sense (as opposed to exactly at a small number of frequencies)). (Other techniques of computing this term can be developed. For example, a method involving multiple runs of DOE-2 itself can be developed. However, the preferred implementation is given here; for extrapolation under thermostatic constraints, this method is especially advantageous.) A similar quantity is computed with the simulated temperatures. The difference gives the necessary adjustment due to storage effects.

The preferred embodiment for computing the third heat flow term, "$Q_{sun}$", is as follows when using DOE-2. $Q_{sun}$ can be computed by performing two runs: one as before, and one with all shading coefficients and absorptivities set to zero. The difference in the Loads is $Q_{sun}$.

Three heat-flow-calibrating parameters δ are now introduced: $δ_0$, $δ_{in}$, and $δ_{sun}$. Each is associated with one of the primary flows. They are estimated through a best-fit criterion as follows:

$$Q_{audit,net} - δ_0 \cdot [-L(T_{in}-T_{out})] - δ_{in} \cdot Q_{in,storage} - δ_{sun} \cdot Q_{sun} = \text{Best Fit to 0.}$$

These calibration parameter δs are determined through a sequential and iterative data windowing process (as described above).

Figure 7:
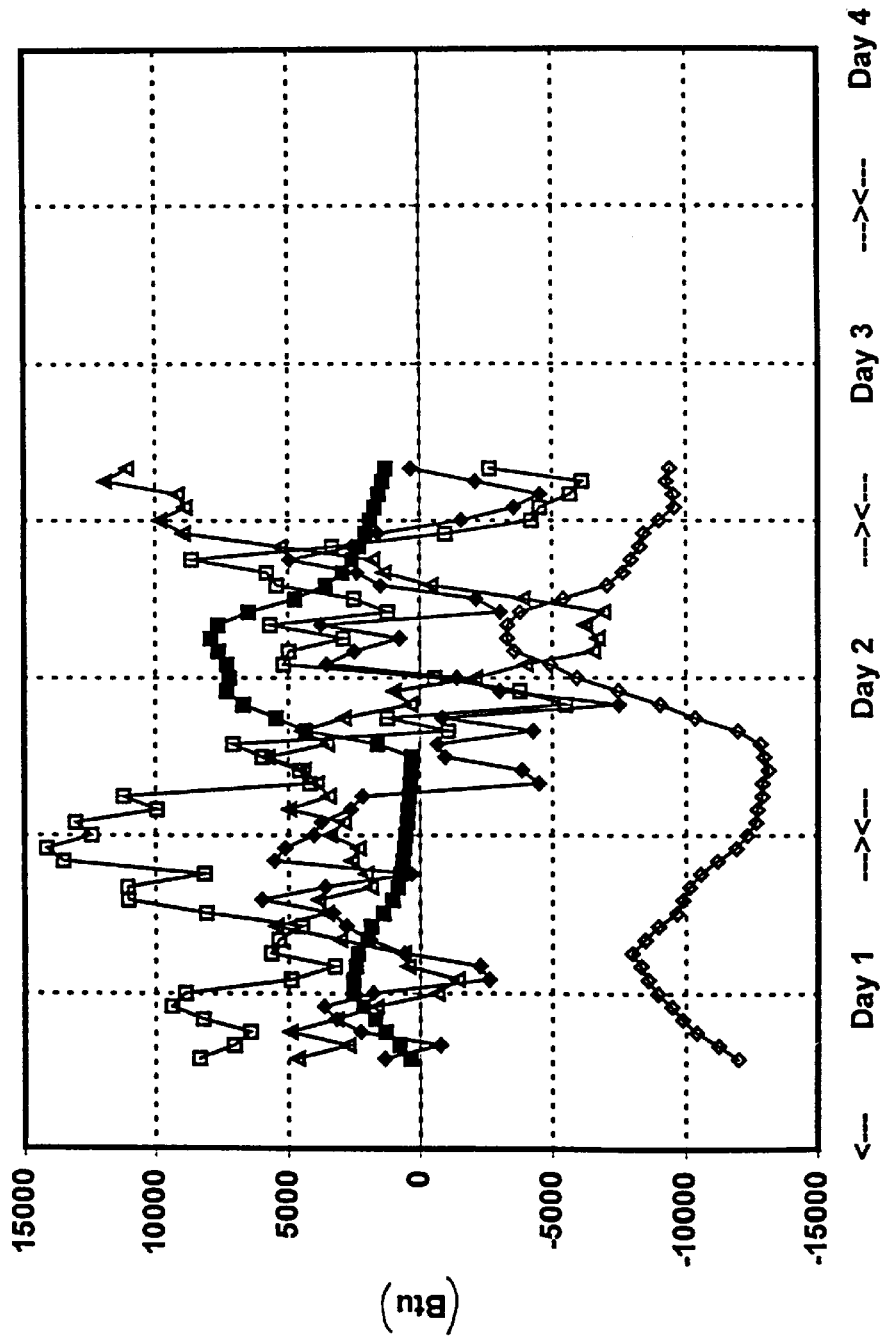
FIG. 7 illustrates the additional heating/cooling needed for the measured performance to be consistent with the audit building description for the exemplary building for the DOE-2.1E calibration.

Referring now to FIG. 7, the additional heating/cooling needed for the measured performance to be consistent with the audit building description for the building of the first example is illustrated. For the real building, this quantity is zero, of course. The calibration terms, the δs, are introduced, and the associated parameters are estimated to give a best fit to the additional heating/cooling. For this first example, FIG. 7 illustrates the four quantities $Q_{audit,net}$, $[-L(T_{in}-T_{out})]$, $Q_{in,storage}$, and $Q_{sun}$, as well as the additional heating/cooling after its best fit to zero. The quantity $δ_0$ was estimated in the data window Day 2 Hour 2 to Hour 4 (RMS error in this data window was 3477 Btu/hr), and $δ_{in}$ and $δ_{sun}$ were determined in the data window Day 1 Hour 8 to Day 3 Hour 5 (RMS error in this data window was 3183 Btu/hr). The values for this first example are: $\delta_0 = -0.172 \pm 0.023$, $\delta_{in} = -0.345 \pm 0.033$, $\delta_{sun} = -0.449 \pm 0.060$. It should be noted that the quoted errors are purely statistical estimates of the standard errors and do not include possible systematic errors. It should also be noted that while these data windows involve some overlap, this is not necessarily required. Each data window may be mutually exclusive to other data windows. (This computation corresponds to step 225'.) A negative value of $\delta_{sun}$ implies that the solar gains are overestimated by the audit building values, and the corrective flow therefore corrects it downward. Other parameters are similarly interpreted. If, in this example, the term "$-0.172 \cdot [-L(T_{in}-T_{out})] + 0.345 \cdot Q_{in,storage} + 0.449 \cdot Q_{sun}$" is added to the effective internal gains, then the building shell performance is calibrated.

Advantageously, the method and apparatus of the present invention can achieve its goals with a minimal number of DOE-2 runs. For example, it should be noted that in the second embodiment of the first example, as explained in detail above, only one DOE-2 run was performed to determine the additional heating/cooling requirement, and an additional run with solar gains turned off was performed to determine $Q_{sun}$.

By combining the knowledge of these $\delta$s with additional information, it is possible to modify the DOE-2 inputs with a view to making the $\delta$s closer to zero. From a purely calibration point of view, however, this step is not required. Furthermore, adjusting the inputs based on the $\delta$s is unsystematic and therefore a haphazard approach.

Having calibrated the shell (Load) characteristics, we can now address the Plant parameters (step 225'). It should be understood that calibrating the shell characteristics according to the principles of the present invention synergistically improves the ability to calibrate the HVAC parameters. As before, the heating requirement $Q_{audit,net}$ is determined during the period of heating system operation (i.e., Day 3 Hour 5 to Day 4 Hour 7). The correction terms are also computed and incorporated to obtain calibrated heating delivered as follows:

$$Q_{audit,net} - \delta_0 \cdot [-L(T_{in}-T_{out})] - \delta_{in} \cdot Q_{in,storage} - \delta_{sun} \cdot Q_{sun}.$$

In contradistinction to the earlier period (when the heating system was inoperative) when this quantity was best-fit to zero, this quantity now represents the best estimate of the heat delivered by the heating system. The modeled gas consumption to provide this heat is compared with the actual gas consumption. The hot water boiler model in DOE-2 is simple and a subroutine for this computation can be readily written without undue experimentation. The parameter(s) to be estimated are determined from an engineering consideration, e.g., the heat input ratio is selected as the parameter to be estimated. Using standard non-linear estimation techniques, this parameter is estimated to be 1.253 (compared to a nominal audit value of 1.15). All other parameters, such as the minimum and maximum part-load ratios and part-load penalty functions, are left at their audit values. (RMS error in this data window was 6085 Btu/hr.)

Figure 8:
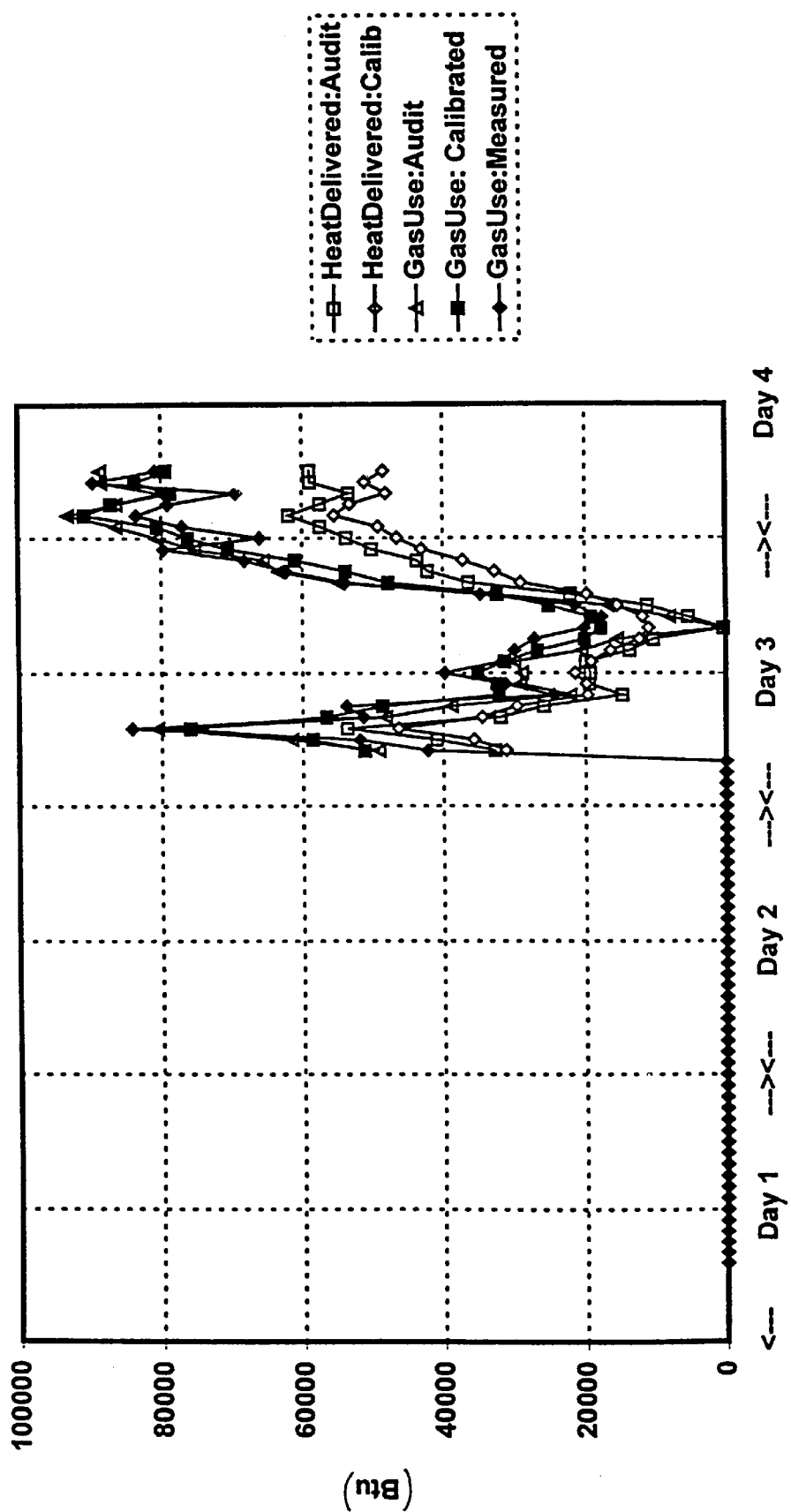
FIG. 8 illustrates the calibration of the boiler for the exemplary building for the DOE-2.1E calibration.

Referring now to FIG. 8, various quantities related to the boiler heating system calibration are illustrated for the building of the first example where Day 1 of the test data period continues to correspond to "Day 65". These quantities are Heat Delivered—Audit, Heat Delivered—Calibrated, Gas Use—Audit, Gas Use—Calibrated, and Gas Use—Measured. For this calibration, the heat-input-ratio is estimated from the data, and all other boiler parameters are left at their audit values. It should be noted that a better-than-audit shell and a worse-than-audit Plant can have compensating effects on the energy consumption estimates for the audit building.

An alternative approach, which uses the DOE-2 simulator as the Plant subroutine, is to perform a simulation as explained above except for (a) including a two-pipe fan-coil as the System and a gas-fired hot-water boiler as the Plant, (b) including corrections as before to account for the difference between the simulated zone air temperature and the measured temperatures, and (c) including a corrective term to account for the difference between the audit building shell and the real building shell:

$$-\delta_0 \cdot [-L(T_{in}-T_{out})] - \delta_{in} \cdot Q_{in,storage} - \delta_{sun} \cdot Q_{sun},$$

suitably modified as a gain term designed to correct the Loads. The non-linear parameter estimation proceeds as explained above except that at each step a call to the DOE-2 simulator is necessary.

Finally, the Systems parameter(s) are addressed (step 225'). Fans, pumps, coils, economizers, temperature resets, etc. are all amenable to direct measurement and evaluation. Although not usually beneficial, it is possible to include one or more System parameters in the set of calibration parameters that are estimated from data. Such an application is within the spirit and scope of the present invention. More typically, with respect to the energy balance, measurement of fan energy and of outdoor air intake provides their contributions to the energy balance directly. Thermostat throttling range and similar parameters affect the deviation of the zone temperature from the set-point, and such effect on the energy balance is already incorporated in the building shell (Load) characteristics. The Systems parameters are then either directly measured or left at the audit values.

In general cases, the fitting function should be properly selected. The basic issue is the following: If the Plant is not operating during a part of the test (such as Day 1 Hour 1 to Day 3 Hour 5 in the test data period in the first example), it is appropriate to fit the simulation output for the audit building of the additional heating/cooling load to zero. During the part of the test when the Plant is operating (such as Day 3 Hour 5 to Day 4 Hour 7), it is appropriate to fit the simulated fuel use to measured fuel use. Considering by way of example, the performance of heating season tests, it is possible, during an hour when the load is low, that the errors are such that cooling is needed in the simulation. A cooling Plant, however, may not even be specified in the simulation input file. Even assuming that a cooling Plant is specified, the simulated fuel use for cooling should not be intermingled with the fitting of simulated fuel use to measured fuel use. One procedure to avoid this possibility is to always specify both a heating and a cooling Plant while tracking simulated heating and cooling fuel use separately. The parameter estimation can then be effectuated by defining the objective function to be minimized such that both simulated heating fuel use and cooling fuel use are best fit to measured values (the measured fuel use for cooling is zero in this example). An alternative variant is to introduce weights for the heating fuel use and the cooling fuel use in the fitting process.

Another alternative is to compute delivered heating/cooling from measured fuel use and to incorporate this as an internal gain. The additional heating/cooling term can then be best fit to zero. This alternative, however, is generally not feasible with current simulator programs because it requires determining the amount of heating/cooling supplied for a given amount of fuel use, which determination is something simulations are typically not equipped to deal with directly.

(Simulations are usually designed to deal directly with the amount of fuel use to supply a given amount of heating/cooling.)

If the tests are performed under conditions such that when the heating Plant is on, the Plant provides a large enough amount of heat that errors cannot push the simulation into a cooling mode, the above-explained problem does not occur. This is the situation in the first example. In the heating season, easily-measurable electric heat can be introduced (if feasible) during the first period of the test while the heating Plant provides significant heat during the last period of the test. If tests are performed to evaluate the cooling performance, then the only way to maintain temperatures required by the test protocol may be by making the cooling Plant available during the entire test. In this situation, a simulated building requiring heating is a real possibility, but the method described above can be employed for the best-fit. The Loads and Plant parameters may consequently have to be estimated together, even if an iterative and sequential approach is employed.

Advantageously, the parameters estimated from the above-described data analysis of the present invention can be incorporated to extrapolate performance to any other period. The extrapolation problem can be considered in two contexts. The first context is the prediction of energy use when given the indoor temperatures and all the driving functions. (An alternative variation of this is the prediction of temperatures given energy use.) The second context is the prediction of indoor temperatures and energy use given thermostatic constraints.

With respect to the first context, extrapolation to a period with measured zone temperatures, the steps are as follows (corresponding to steps 225–255).

(1) Modify the DOE-2 inputs to reflect the estimated Plant and any Systems parameters.

(2) Determine the corrective flows:

$$-\delta_0 \cdot [-L(T_{in}-T_{out})] - \delta_{in} \cdot Q_{in,storage} - \delta_{sun} \cdot Q_{sun}.$$

Convert this to a gain that results in this contribution to the Loads. Introduce this gain and perform the simulation. Compute corrections to account for any differences between measured and simulated temperatures as before. (If necessary, iterate until the simulated temperatures converge to a given tolerance.) Energy use and/or temperatures can be simulated and, if necessary, compared to actual energy use and/or temperatures.

With respect to the second context, extrapolation to a period incorporating thermostatic constraints, the steps are as follows.

(1) Modify the DOE-2 inputs to reflect the estimated Plant and any Systems parameters.

(2) Perform a simulation of the building for the extrapolation period. From the output, determine the corrective flows:

$$-\delta_0 \cdot [-L(T_{in}-T_{out})] - \delta_{in} \cdot Q_{in,storage} - \delta_{sun} \cdot Q_{sun}.$$

Convert this to a gain that results in this contribution to the Loads. Introduce this gain and perform the simulation. Perform iterations until the simulated temperatures and energy use converge satisfactorily.

Figure 9:
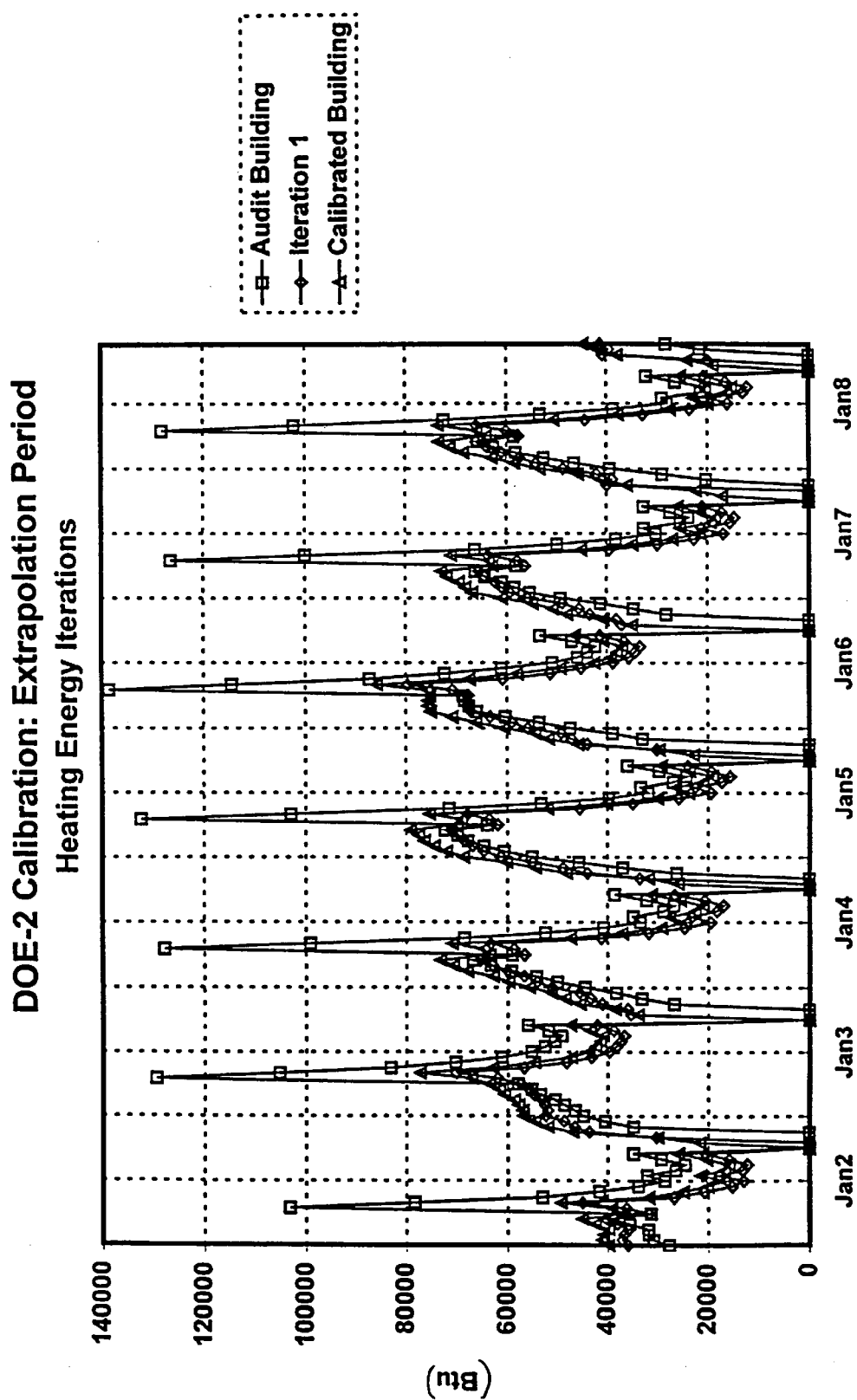
FIG. 9 illustrates iterations for extrapolation that start with the audit building and converge toward the calibrated building for the exemplary building for the DOE-2.1E calibration.

Referring now to FIG. 9, an iteration process is illustrated for extrapolation that starts with the audit building and converges toward the calibrated building for the one-zone building of the first example. One iteration of heating energy use by the boiler is shown graphically for an extrapolation period that is from January 2 to January 8 of some typical year. The graph begins with the audit building, continues with the first iteration, and concludes with the convergent values for heating energy use. To achieve these results, the audit building is first simulated, and then corrective flows are computed and incorporated into the next iteration. Eventually, the iterations converge to the calibrated building. It should be noted that the term "audit building" is used here in the sense that it already incorporates any directly-modified System and Plant parameters. Iterations are required for the heating energy use, as will be recognized by one of ordinary skill in the art after reading and understanding the principles of the present invention, because there are times during a simulation when the heating energy use is known and the inside temperature(s) must be calculated, which inside temperature(s) affect the primary flow determinations. This is true, for instance, in the early morning when the HVAC system is activated to bring the temperature up to an acceptable level.

Figure 10:
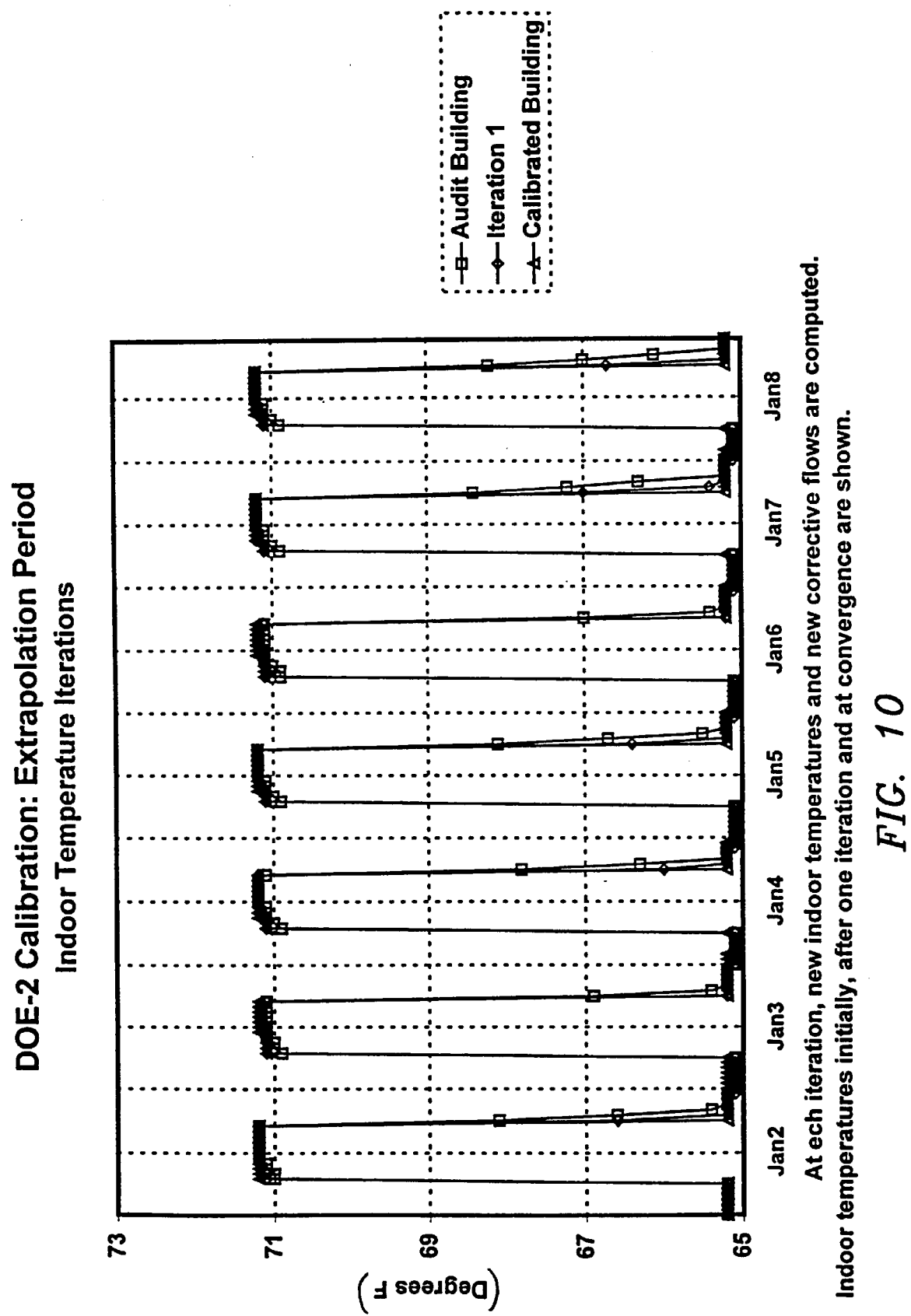
FIG. 10 illustrates iterations on indoor temperatures for the exemplary building for the DOE-2.1E calibration.

Referring now to FIG. 10, the iteration process of FIG. 9 is illustrated for extrapolation that starts with the audit building and converges toward the calibrated building for the one-zone building of the first example. One iteration of indoor temperature is shown graphically for an extrapolation period that is from January 2 to January 8 of some typical year. To achieve the graphical results, new indoor temperatures and new corrective flows are computed at each iteration. This iterative procedure, after estimating the calibration parameters, of starting from the audit building and converging to the calibrated building solves the problem of incorporating the estimated parameters into the relevant simulator, which is DOE-2.1E in this first example.

In the second example, the present invention is explained in the context of a multi-zone building and a generically-named simulator. Principles and concepts of the present invention that are introduced in the first example and that are applicable or easily-extendable to the second example will not be explained in any significant detail with respect to the second example. In this second example, the building is heated by a hot water boiler and has an interior temperature that is measured in six different zones. The data measurements illustrated in FIGS. 4 and 5 pertaining to both the weather conditions and the solar radiation (to which the building is exposed) are also utilized in this second example of the six-zoned building.

Figure 11:
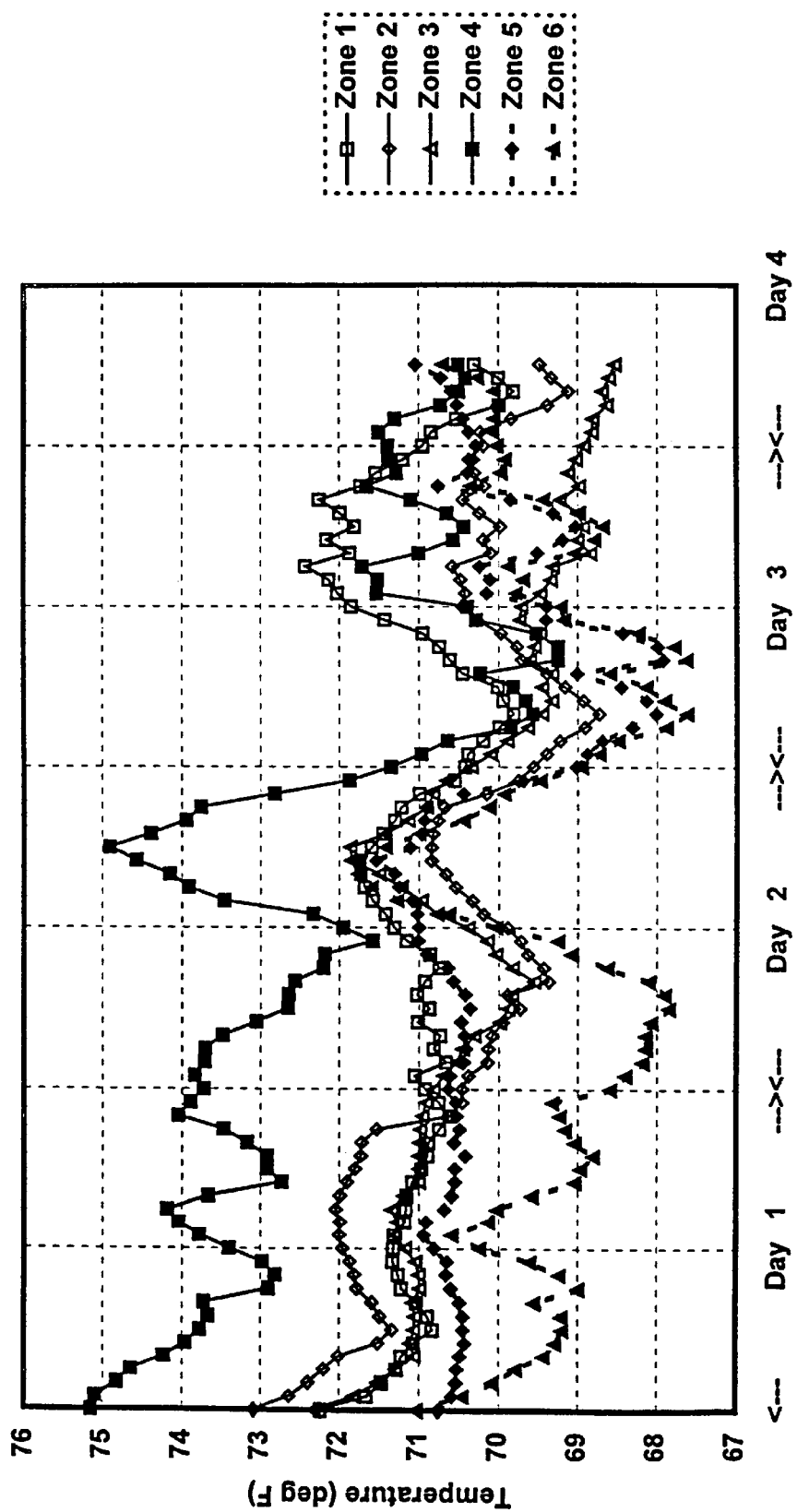
FIG. 11 illustrates six indoor temperatures during the test period for an exemplary multi-zone building.

Referring now to FIG. 11, six indoor temperatures are illustrated during the test data period for the multi-zone building of the second example. The test data period runs from "Day 65" Hour 1 to "Day 68" Hour 7; as before, Day 1 of the graph corresponds to the 65th day of the year ("Day 65"). Other measurements include: ambient temperature and relative humidity; solar radiation on a horizontal surface, as well as a vertical surface facing south; wind speed; and electricity used. No other source of heating or cooling is operating until Day 3 Hour 5. (When a source is operating, it can be easily accommodated as long as the resulting heat flow is measured.) However, from Day 3 Hour 5 until the conclusion of the test data period (at Day 4 Hour 7) the heating system is activated and consuming gas as fuel.

Figure 12:
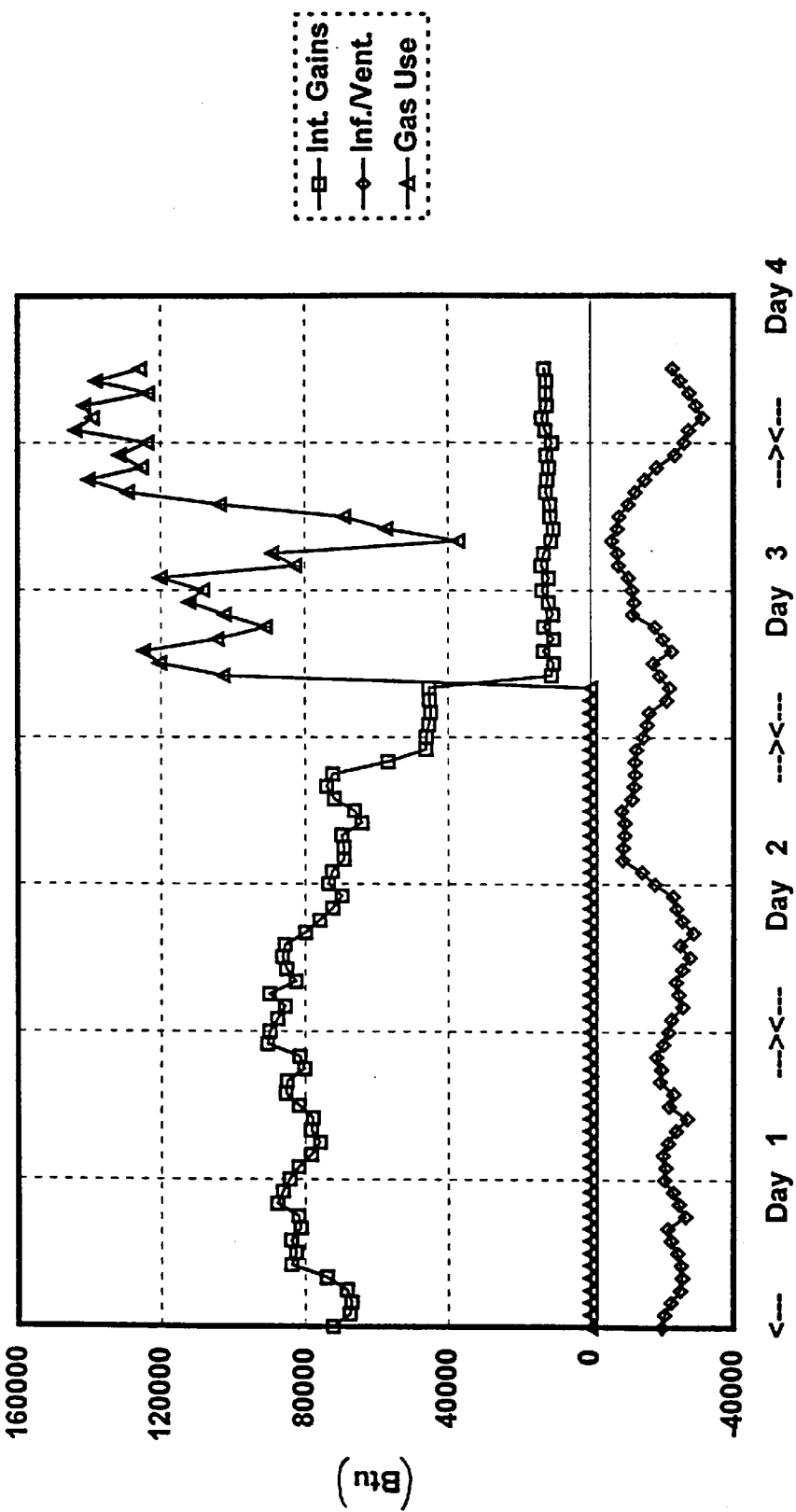
FIG. 12 illustrates internal gains, heat flow from infiltration/ventilation, and gas use during the test period for the exemplary multi-zone building.

Referring now to FIG. 12, the internal gains, the heat flow from infiltration/ventilation, and the gas use during the test data period are illustrated for the multi-zone building of the second example. The heating system is activated during the last part of the test data period (from Day 3 Hour 5 to Day 4 Hour 7), which results in the gas consumption shown. (These procedures and measurements correspond to steps 210 and 215.)

A building description of the exemplary six-zone building is obtained from an audit (step 205), and an hourly simulation of the building with the above-noted data measurements as the inputs is performed thereafter (step 220). This simulator shall be referred to as Simulator A to further reinforce the simulator-independence of the method and apparatus of the present invention. (The STEM simulator was actually used for this second example to arrive at the numerical solution; therefore, in accordance with STEM, internal gains are treated as gains to zone air in this second example.) If the audit description and material properties are exact (and if the simulation is exact), then the simulator will output zero as the heating/cooling load for every hour during the first part of the test (while the heating system Plant is inoperative) and will predict gas use during the second part of the test that will match the measured gas use. Because of deviations from this ideal simulation situation, Simulator A usually produces heating/cooling Loads during the first part of the test, and the predicted gas use does not usually match the measured gas use during the second part of the test. The calibration can be viewed as correcting these discrepancies through a suitable best-fit process.

The solar radiation readings may have to be processed in a manner that provides the data as needed by Simulator A. Depending on the simulator, the data channels needed might be different. For example, a different simulator may require additional input channels such as indoor relative humidity, wind direction, etc. The requirements of the chosen simulator are preferably met. In this second example, infiltration/ventilation is directly measured, e.g., through the use of tracer gas technique. The resulting heat flow from the infiltration/ventilation is also shown in FIG. 12.

Analysis begins with the period when the heating system is inactive (Day 1 Hour 1 to Day 3 Hour 5). The additional heating/cooling needed is determined from Simulator A for each of the six zones. The simulation is now preferably modified in such a manner that makes the resulting heating/cooling Loads as close to zero as possible, according to a chosen best fit criterion. Least squares is one example of such a best fit criterion. Instead of directly modifying one of the hundreds of inputs 120 or 130, the input discrepancies can be viewed as resulting in corrections needed for the various primary flows 335.

Calibrating each zone independently is certainly possible, at least in principle, because Simulator A provides the additional heating/cooling needed for each zone of the audit building. It is necessary to allocate properly for each zone the internal gains, the ground heat flow, etc. Because this data may not always be available, the focus for this second example will be on calibrating the multi-zone building as a whole. When the necessary data are available, independently calibrating each zone can be accomplished after understanding the description and teachings of the present invention. Even though many quantities may be computed for each zone, the quantities will be added together to get the whole building quantities for calibration purposes. However, one of ordinary skill in the art will be capable of independently calibrating multiple zones after reading and understanding the whole-building principles of the present invention as explained further hereinbelow.

A rough, PSTAR-type analysis of the magnitudes of various primary flows 335 can be performed with a view toward introducing correction flows 160 proportional to each of the primary flows 335. In this second example, it is determined that the primary terms are defined as follows:

$Q_{in-out}$ The static loss from the building shell (excluding infiltration) due to inside and outside temperature difference;

$Q_{in,storage}$ Discharge/charge of masses due to inside temperature variations; and $Q_{sun}$ Solar gains by the air node.

These primary terms are mathematically expressed as:

$$Q_{in-out} = \Sigma L_i \cdot [T_{in,i} - T_{out}];$$

$$Q_{in,storage} = \Sigma Q_{in,storage,i}; \text{ and}$$

$$Q_{sun} = \Sigma Q_{sun,i}$$

(where "i" denotes a zone index, "$\Sigma$" denotes a summation over the zones, $L_i$ denotes the static loss coefficient of the ith zone, $T_{in,i}$ denotes the temperature of the ith zone, and $T_{out}$ denotes the ambient temperature).

Figure 13:
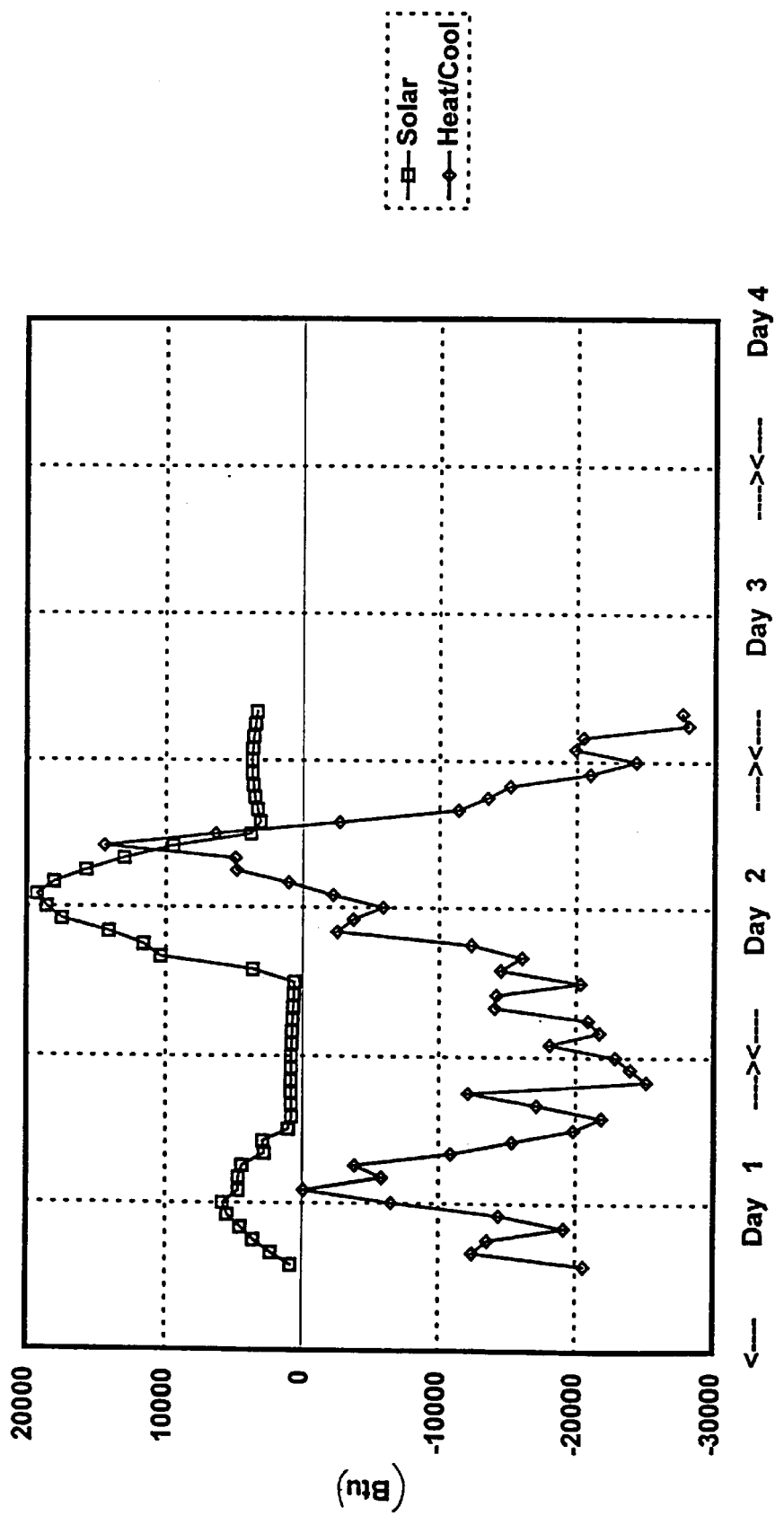
FIG. 13 illustrates the additional heating/cooling needed for the measured performance to be consistent with the audit building description for the exemplary multi-zone building.
Figure 14:
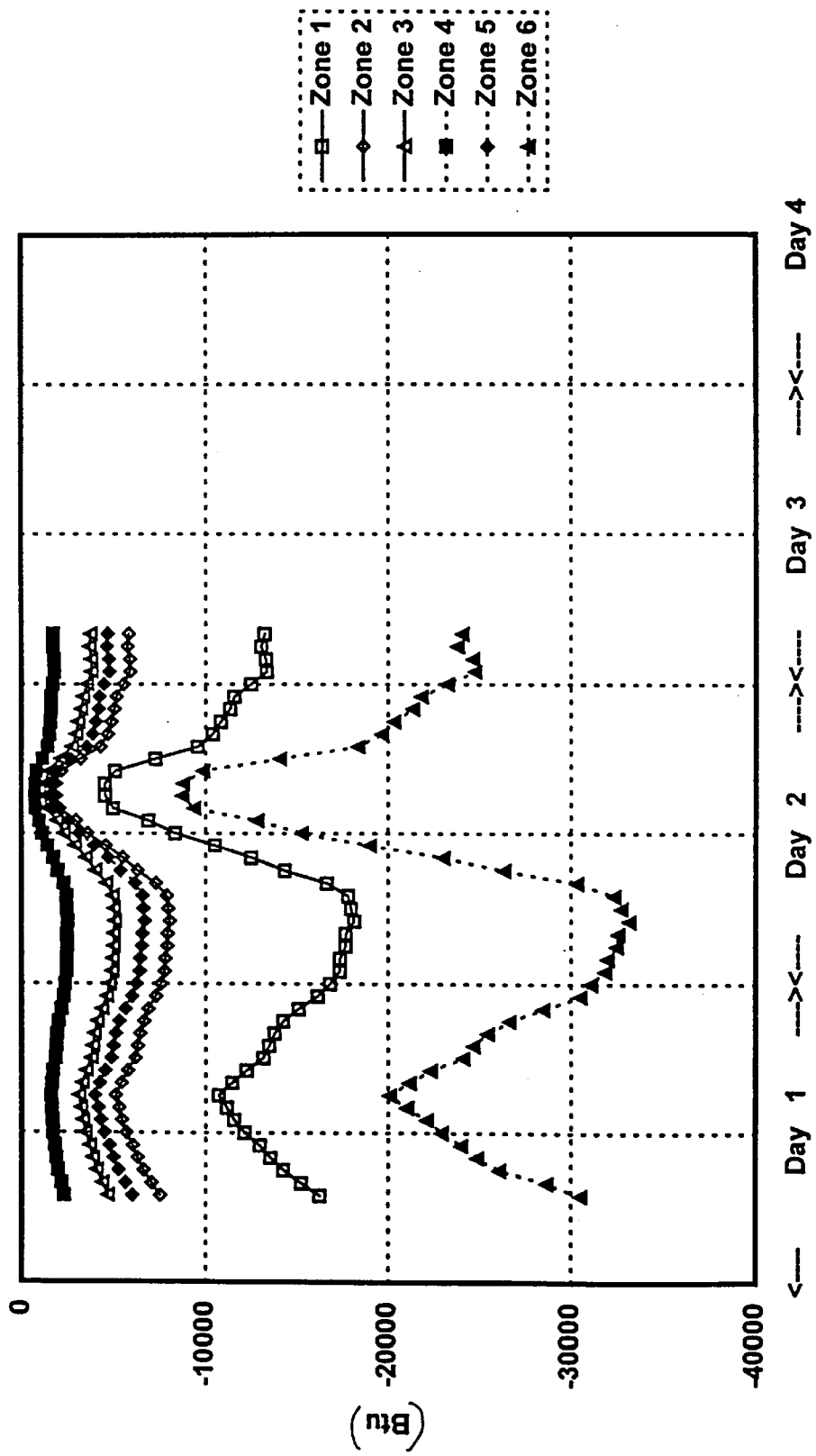
FIG. 14 illustrates another set of correction terms: $L_i \cdot [T_{in,i} - T_{out}]$, for the exemplary multi-zone building.
Figure 15:
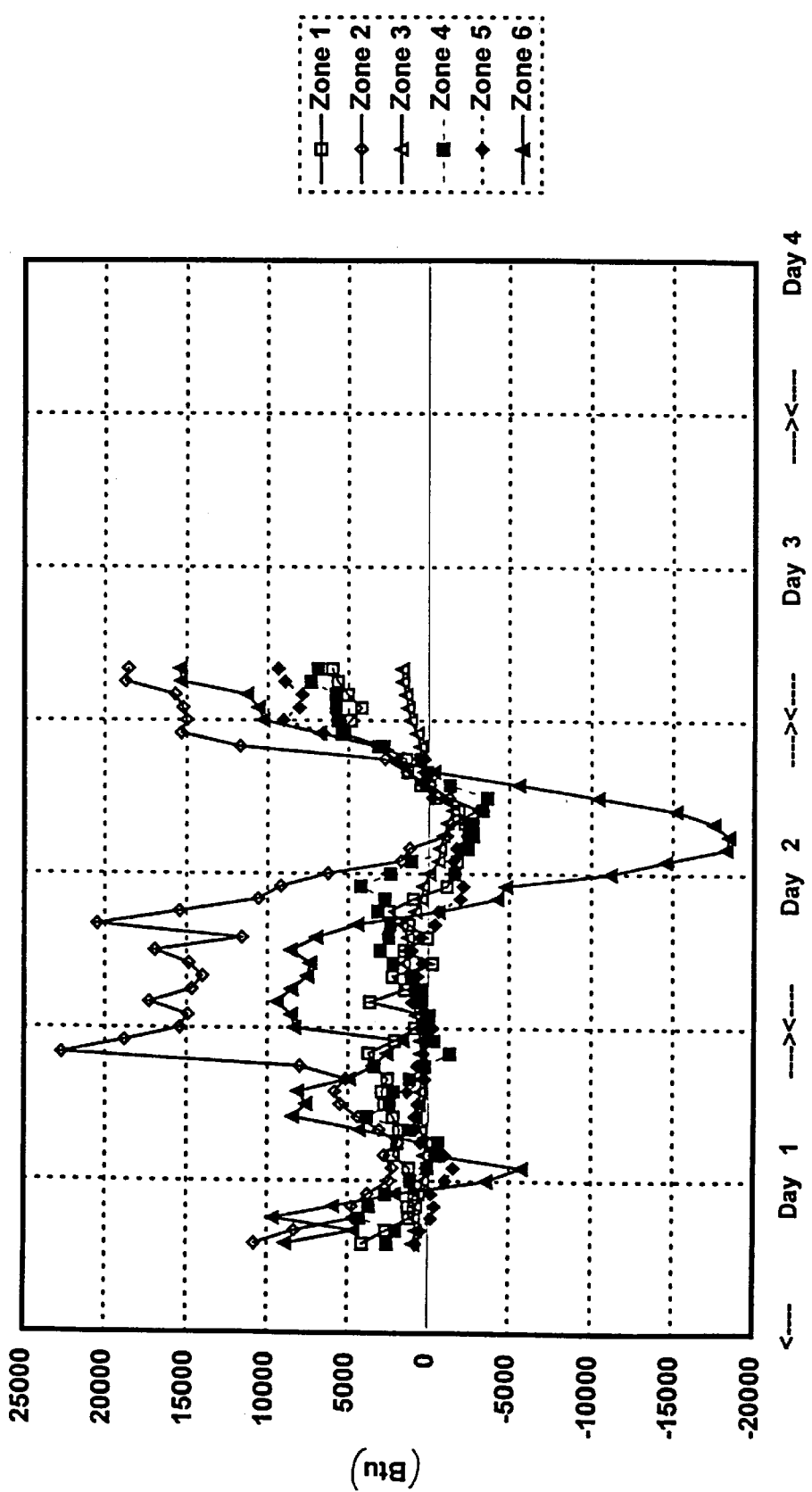
FIG. 15 illustrates another set of correction terms: $Q_{in,storage,i}$, for the exemplary multi-zone building.

Referring now to FIG. 13, the solar gain heat flow, "$Q_{sun}$" illustrates the additional heating/cooling needed for the measured performance to be consistent with the audit building description for the exemplary multi-zone building. For the real building, this quantity is, of course, zero. Other coffective terms are introduced in FIGS. 14 and 15. FIG. 14 illustrates, for the exemplary multi-zone building, another set of correction terms ($L_i \cdot [T_{in,i} - T_{out}]$) corresponding to the static loss from the building shell (excluding infiltration) due to inside and outside temperature difference. FIG. 15 illustrates, for the exemplary multi-zone building, another set of correction terms ($Q_{in,storage,i}$) corresponding to the discharge/charge of masses due to inside temperature variations.

Computation of each of these terms will now be addressed. This computation is discussed in general hereinabove with respect to the first example. For this second example, the simulator used (Simulator A) directly provides these primary flows 335. Regardless of how these primary flows 335 are calculated, they are to be added as follows to energy balance (the $\delta$s are at this point unknown parameters):

$$\delta_0 \cdot Q_{in-out} + \delta_{in} \cdot Q_{in,storage} + \delta_{sun} \cdot Q_{sun}.$$

The addition of these heat flows merely decreases the heating Loads by the corresponding amount. Thus, the problem of fitting the heating/cooling load to zero by adding the primary flows 335 in proper proportions reduces to the problem of estimating the $\delta$s by the following equation:

$$Q_{audit,net} - \delta_0 \cdot Q_{in-out} - \delta_{in} \cdot Q_{in,storage} - \delta_{sun} \cdot Q_{sun} = \text{Best Fit to 0}.$$

A sequential and iterative process is used with $\delta_0$ estimated in the period Day 2 Hour 2 to Day 2 Hour 6. The parameters $\delta_{in}$ and $\delta_{sun}$ are estimated with the rest of the data. These estimations result in $\delta_0 = 0.078$, $\delta_{in} = -0.440$, and $\delta_{sun} = -0.667$ (step 225).

For any period with measured driving functions and zone temperatures, the whole building heating/cooling load is given by:

$$Q_{calibrated,net} = Q_{audit,net} - 0.078 \cdot Q_{in-out} + 0.040 \cdot Q_{in,storage} + 0.667 \cdot Q_{sun}$$

Analysis continues with the period when the heating system is active (Day 3 Hour 5 to Day 4 Hour 7). The delivered heat can be computed as $Q_{calibrated,net}$. The gas consumption to provide this heat is computed by the Plant model. For this second example, the boiler model in BLAST is used. The parameters of this model are:

| | |
|---|---|
| Air Fuel Ratio | 17 |
| Heating Value of Fuel | 20,013 |
| Stack Leaving Temperature | 300 |
| Heating Capacity | 300,000 |
| Minimum part load ratio | 0.1 |
| Maximum part load ratio | 1.05 |
| Coefficient RFuelB(1) | 0.563 * p |
| Coefficient RFuelB(2) | 0.921 * p |
| Coefficient RFuelB(3) | −0.518 * p |

The parameter p may be viewed as the ratio of actual efficiency to the audit efficiency. The parameter p was estimated from data to be 0.876.

Heating and cooling Loads of the calibrated multi-zone building under thermostatic constraints are determined through iterations. The primary flows 335 are computed using the zone temperatures, and the zone temperatures are computed using the primary flows 335; therefore, iterations are utilized. Repeated simulations of the audit building under the thermostatic constraints are performed, initially with no corrective flows 160 as inputs. Measured driving functions or weather data such as that from Typical Meteorological Year can be used; an internal gains profile is employed. First, the zone Loads and temperatures are computed. Using these temperatures, the primary flows 335 are computed. The product of the calibration parameters δ and their respective primary flows 335 are then presented to the simulation as corrective flows 160. (These procedures correspond to steps 230–250.)

Figure 16:
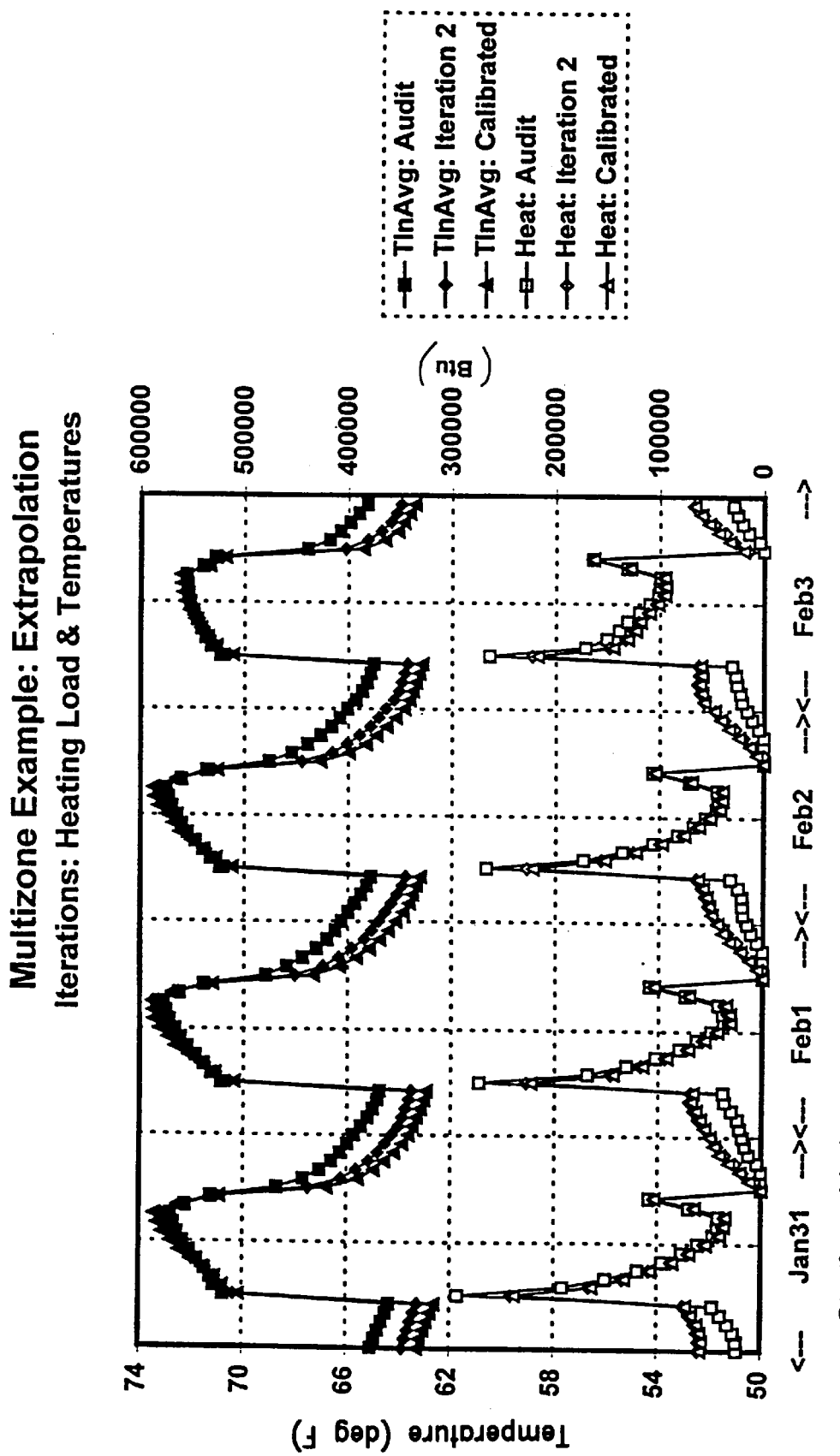
FIG. 16 illustrates iterations for extrapolation that start with the audit building and converge toward the calibrated building for the exemplary multi-zone building.

The iterations are continued until satisfactory convergence is achieved (step 255). The results of these iterations are shown in FIG. 16. Referring now to FIG. 16, iterations are illustrated for extrapolation that start with the audit building and converge toward the calibrated building for the exemplary multi-zone building. The extrapolation period is from January 31 to February 3 of some typical year. Only the Loads under thermostatic constraints are shown; converting these Loads into fuel use presents no additional conceptual issues that were not addressed in the first example.

Thus, in one embodiment, the following is described. An apparatus for calibrating a building energy simulation with performance data, in which the apparatus includes: a storage device containing a model of the building with or without HVAC systems included in the model; a shell processor interpreting the building model to identify and compute the primary heat flows from input data, and to compute the corrective heat flows from the primary flows and calibration parameters; an HVAC processor to modify the audit values of HVAC parameters to make them functions of the HVAC calibration parameters; and a parameter estimator based on a best-fit criterion, which parameter estimator can sequentially and iteratively estimate the parameters in different segments of data.

Many alternative embodiments are possible. For example, if it is deemed that a secondary flow (e.g., $Q_{ground}$) is not properly simulated by Simulator A, then one can introduce a correction flow $\delta_{ground} \cdot Q_{ground}$, in which the calibration parameter $\delta_{ground}$ is a user-defined parameter (i.e., not estimated in the process). Also, an inspection of δs may suggest changes to the building description.

As another example, values far from zero signal large corrections and consequently possibly serious errors in the inputs 114. A variant of the inventive process is to modify the building description suggested by the inspection and to re-estimate δs, possibly iterating until the δs are sufficiently close to zero.

Furthermore, another alternative embodiment entails an analysis of residuals, its autocorrelations, etc. Such analysis often suggests possible improvements to the audit description. Additional modeling can also be employed to capture information in the residuals.

As for yet another alternative embodiment, if it is deemed that a certain component (or certain components) is well-characterized by the audit description, then the correction terms can be configured to exclude that component. Furthermore, the correction terms and associated parameters can, in general, be configured in a number of ways depending on the particular building and available data. The corrective flows can be computed as convenient. Using the simulator 110 itself is a possibility.

With respect to when the building is to be treated as consisting of several zones, correction terms can be computed for each of the zones. How many distinct δs are introduced and estimated depends on whether the data supports reliable estimation of the parameters.

As for yet another alternative embodiment, utility bill analysis can be used in the simulation process. Utility bills typically contain fuel (electricity and gas) use data for a given billing period, as well as some measure of peak electrical demand (in some cases). Because of easy availability of such data, it is of interest to extract energy performance information from such data. One approach is to perform simulations, such as DOE-2 simulations (by combining building description with weather and occupancy data). Although calibration of the simulation model with billing data is more tenuous than calibration with more "refined" data such as hourly data, it is still of interest. The inventive calibration approach can be adapted to this process by starting with the parameters to be estimated as the δs and the HVAC parameters. This approach preferably continues with a non-linear estimation of these parameters. Multiple calls to the simulator will be necessary in this process. If one or more parameters is poorly estimated, it may be necessary to restrict the number of parameters to be fewer. Many standard techniques such as the Monte Carlo technique (Numerical Recipes by William Press et al., Cambridge University Press, 1986) are available to determine confidence limits of the estimated parameters.

As for still more alternative embodiments, a reduced set of calibration parameters may be estimated, possibly by combining the shell and HVAC parameters depending on the data. Also, the building energy simulator may be, for example, any public or private domain simulator 110. Furthermore, a variety of techniques may be employed to compute corrective heat flows without departing from the spirit and scope of the present invention. Additionally, instead of real data, synthetic data may be used to compare different simulators 110. Moreover, this inventive calibration method and apparatus can be used in conjunction with humidity considerations in buildings.

And as examples of possible uses for the apparatus and method of the present invention: the present invention may be used in the context of an evaluation of the performance of a building and its components and subsystems. The apparatus and method of the present invention may be used in the context of commissioning a building. The apparatus and method of the present invention may be used in the context of diagnostics for a building, including on-line diagnostics. The apparatus and method of the present invention may also be used in the context of identifying good retrofit opportunities for buildings.

Moreover, the present invention is not limited to only building simulations. For example, the determination of calibration parameters, and their application to a simulator, may be used for the simulation of systems in general. Additionally, the iterative procedure, which can be applied when an output variable affects one or more calibration parameters, is likewise applicable to general simulation situations.

Although a preferred embodiment of the method and apparatus of the present invention has been illustrated in the accompanying Drawings and described in the foregoing Detailed Description, it will be understood that the invention is not limited to the embodiment disclosed, but is capable of numerous rearrangements, modifications and substitutions without departing from the spirit of the invention as set forth and defined by the following claims.

I claim:

1. A computer-aided method for calibrating a building simulator with corrective flows, comprising the steps of:
   providing audit inputs to said simulator, said audit inputs derived from a building system to be simulated;
   providing at least one driving function input to said simulator, said at least one driving function input impacting said system;
   providing at least one corrective flow input to said simulator, said at least one corrective flow input improving an accuracy of said simulator; and
   performing a building simulation on said simulator using said audit inputs, said at least one driving function input, and said at least one corrective flow input, said simulation producing at least one output.

2. The method according to claim 1, wherein said step of providing at least one driving function input to said simulator further comprises the step of providing a plurality of driving function inputs to said building simulator, said plurality of driving function inputs comprising at least one of weather elements to which said building is exposed, solar radiation to which said building is exposed, and occupancy-related characteristics of said building.

3. The method according to claim 1, wherein said at least one output of said simulation comprises simulated fuel use of said building to be simulated.

4. The method according to claim 1, wherein said at least one output of said simulation comprises at least one simulated inside temperature of said building to be simulated.

5. The method according to claim 4, further comprising the steps of:
   prior to said step of providing at least one corrective flow input to said simulator, performing a preliminary simulation of said building simulator to produce at least one preliminary simulated inside temperature; and
   calculating at least one primary heat flow from said at least one preliminary simulated inside temperature.

6. The method according to claim 5, wherein said step of performing a simulation on said simulator comprises the step of performing a first simulation iteration on said building simulator, said first simulation iteration producing at least one first iteration simulated inside temperature.

7. The method according to claim 6, further comprising the steps of:
   determining whether said first simulation iteration has reached a predetermined level of convergence based on, at least in part, said at least one first iteration simulated inside temperature; and
   if not, recalculating said at least one primary heat flow from said at least one first iteration simulated inside temperature and performing a second simulation iteration on said building simulator using the recalculated at least one primary heat flow, said second simulation iteration producing at least one second iteration simulated inside temperature.

8. The method according to claim 1, further including the step of:
   determining said at least one corrective flow input by, at least in part, a heat flow and an associated shell calibration parameter.

9. The method according to claim 8, wherein said heat flow comprises a primary heat flow of said system to be simulated, said primary heat flow comprising at least one of a static-loss-from-a-shell-of-said-system heat flow, a discharge/charge-of-masses-due-to-inside-temperature-variations heat flow, and a solar-gains-by-an-air-node-of-said-system heat flow.

10. The method according to claim 8, further including the step of:
    determining said associated shell calibration parameter after simulating said system under predetermined conditions.

11. The method according to claim 10, wherein said step of determining said associated shell calibration parameter further includes the step of determining a plurality of associated shell calibration parameters; and
    wherein said step of determining a plurality of associated shell calibration parameters includes the step of performing a best fit to energy use analysis of a sum of addends, said sum of addends including a plurality of products of each individual associated shell calibration parameter of said plurality of associated shell calibration parameters and the heat flow that is associated with said each individual associated shell calibration parameter.

12. The method according to claim 11, wherein said step of performing a best fit to energy use analysis comprises the step of performing a best fit to zero.

13. The method according to claim 10, wherein said step of determining said associated shell calibration parameter after simulating said system under predetermined conditions comprises the step of:
    determining said associated shell calibration parameter through a data windowing process in which at least one data window includes a Heating/Ventilating/Air Conditioning non-operating segment.

14. The method according to claim 1, wherein said step of providing audit inputs to said simulator further comprises the step of:
    providing at least one modified Heating/Ventilating/Air Conditioning parameter input.

15. The method according to claim 14, further comprising the step of:
    determining said at least one modified Heating/Ventilating/Air Conditioning parameter input in a data window that includes a Heating/Ventilating/Air Conditioning operating segment.

16. An article of manufacture for improving a building simulation, comprising:
    a computer-accessible storage medium;
    computer programming stored on said storage medium;
    wherein said computer programming is configured to be accessible from said computer-accessible storage medium by a processor and thereby cause said processor to operate so as to:
    receive as input an audit shell description of a building to be simulated;
    receive as input at least one measured driving function of said building to be simulated;

calculate at least one heat flow of said building based, at least in part, on said audit shell description and said at least one measured driving function;

calculate at least one corrective flow based, at least in part, on said at least one heat flow, wherein said at least one corrective flow can thereby improve an accuracy of said building simulation; and provide said at least one corrective flow as an input to a building simulator as at least one different value of a driving function.

17. The article of manufacture of claim 16, wherein said at least one different value of a driving function comprises at least one of a new driving function input and a modified driving function input.

18. The article of manufacture of claim 16, wherein the computer programming is further configured to cause said processor to:

determine at least one primary heat flow based on an analysis of which heat flows of said building to be simulated dominate an energy balance of said building to be simulated; and calculate said at least one corrective flow based, at least in part, on said at least one heat flow, said at least one heat flow comprising said at least one primary heat flow.

19. The article of manufacture of claim 16, wherein the computer programming is further configured to cause said processor to:

determine at least one shell calibration parameter based on at least one output of said building simulator; and calculate said at least one corrective flow based, at least in part, on said at least one shell calibration parameter.

20. The article of manufacture of claim 16, wherein the computer programming is further configured to cause said processor to:

receive as input an audit Heating/Ventilating/Air Conditioning description of said building to be simulated;

produce at least one Heating/Ventilating/Air Conditioning calibration parameter based, at least in part, on at least one output of said building simulator;

produce at least one modified Heating/Ventilating/Air Conditioning variable based, at least in part, on said audit Heating/Ventilating/Air Conditioning description and on said at least one Heating/Ventilating/Air Conditioning calibration parameter; and provide said at least one modified Heating/Ventilating/Air Conditioning variable to said building simulator.

21. The article of manufacture of claim 16, wherein the computer programming is further configured to cause said processor to:

receive simulated energy use as output from said building simulator;

execute a best fit analysis of measured energy use to said simulated energy use to estimate at least one parameter.

22. The article of manufacture of claim 21, wherein the computer programming is further configured to cause said processor to:

execute said best fit analysis such that Heating/Ventilating/Air Conditioning calibration parameters are estimated in a data window in which a Heating/Ventilating/Air Conditioning system of said building is operational.

23. The article of manufacture of claim 21, wherein the computer programming is further configured to cause said processor to:

execute said best fit analysis such that shell calibration parameters are estimated in a data window in which a Heating/Ventilating/Air Conditioning system of said building is non-operational so that said measured energy use is approximately zero.

24. The article of manufacture of claim 21, wherein the computer programming is further configured to cause said processor to:

execute said best fit analysis such that shell calibration parameters and Heating/Ventilating/Air Conditioning calibration parameters are estimated substantially simultaneously.

25. The article of manufacture of claim 16, wherein the computer programming is further configured to cause said processor to:

calculate said at least one corrective flow by determining a product of said at least one heat flow and an associated shell calibration parameter.

26. The article of manufacture of claim 16, wherein the computer programming is further configured to cause said processor to:

provide at least one modified Heating/Ventilating/Air Conditioning variable as an input to said building simulator.

27. The article of manufacture of claim 26, wherein the computer programming is further configured to cause said processor to:

receive simulated energy use as output from said building simulator for extrapolating performance of said building to be simulated.

28. The article of manufacture of claim 26, wherein the computer programming is further configured to cause said processor to:

receive at least one simulated temperature as output from said building simulator;

recalculate said at least one corrective flow based, at least in part, on said at least one simulated temperature;

provide the at least one recalculated corrective flow as an input to said building simulator; and repeat the reception of said at least one simulated temperature, the recalculation of said at least one corrective flow, and the provision of said at least one recalculated corrective flow until a predetermined convergence is substantially attained.

29. An article of manufacture for improving a building simulation, comprising:

a computer-accessible storage medium;

computer programming stored on said storage medium;

wherein said computer programming is configured to be accessible from said computer-accessible storage medium by a processor and thereby cause said processor to operate so as to:

receive as input an audit shell description of a building to be simulated;

receive as input at least one measured driving function of said building to be simulated;

calculate at least one heat flow of said building based, at least in part, on said audit shell description and said at least one measured driving function;

calculate at least one shell calibration parameter, said at least one shell calibration parameter associated with said at least one heat flow of said building;

execute a building simulator to produce at least one simulated result based, at least in part, on at least one input to said building simulator, said at least one input responsive to said at least one heat flow and the at least one associated shell calibration parameter; and after producing said at least one simulated result and responsive at least partly thereto, calculate at least one Heating/Ventilating/Air Conditioning calibration parameter.

30. A computer-aided method for calibrating a building simulator with corrective flows, comprising the steps of:

inputting, into the building simulator, data representative of attributes of a building to be simulated;

inputting, into the building simulator, data representative of measured driving forces that are capable of impacting the building to be simulated;

performing a simulation of the building to be simulated using the building simulator with the data representative of attributes of the building to be simulated and the data representative of measured driving forces that are capable of impacting the building to be simulated to produce at least one output;

performing an analysis to estimate at least one calibration parameter based, at least in part, on the at least one output; and introducing a variable to the building simulator as a driving force, the variable being responsive to the at least one calibration parameter.

31. The method according to claim 30, further comprising the step of re-performing the simulation of the building to be simulated using the building simulator with the data representative of attributes of the building to be simulated and the data representative of measured driving forces that are capable of impacting the building to be simulated along with the variable to produce at least one different output.

32. The method according to claim 30, wherein the data representative of attributes of the building to be simulated comprises building audit values.

33. The method according to claim 32, wherein the building audit values comprise at least one of building shell audit values and Heating/Ventilating/Air Conditioning system audit values.

34. The method according to claim 30, wherein the data representative of measured driving forces that are capable of impacting the building to be simulated comprise at least one of weather data, solar radiation data, and occupancy-related characteristics data.

35. The method according to claim 30, wherein the at least one output comprises at least one of simulated energy use and simulated temperatures.

36. The method according to claim 30, wherein the building simulator comprises a DOE-2 based simulator.

37. The method according to claim 30, wherein said step of performing an analysis to estimate at least one calibration parameter based, at least in part, on the at least one output comprises the step of performing a best fit analysis of a sum of products to an expected value.

38. The method according to claim 37, wherein the expected value comprises at least one of measured energy use and measured temperatures.

39. The method according to claim 30, wherein the variable comprises a product, the product having the at least one calibration parameter and a heat flow as multiplicands thereof.

40. The method according to claim 39, wherein the heat flow comprises a primary heat flow, the primary heat flow dominating an energy balance equation of the building to be simulated.

41. The method according to claim 30, wherein the at least one calibration parameter comprises at least one shell calibration parameter.

42. The method according to claim 30, wherein said step of introducing a variable to the building simulator as a driving force comprises at least one of the steps of adding a new driving function as a driving force input and modifying a driving force that was previously input in said step of inputting data representative of measured driving forces.

43. The method according to claim 30, wherein the variable comprises a corrective heat flow.

44. The method according to claim 43, wherein the corrective heat flow comprises at least one of a corrective static-loss-from-the-building-shell heat flow, a corrective discharge/charge-of-masses-due-to-inside-temperature-variations heat flow, and a corrective solar-gains-by-an-air-node-of-the-building heat flow.

45. The method according to claim 30, further comprising the step of:

performing a different analysis to determine at least one heat flow based, at least in part, on the at least one output;

wherein the variable comprises the at least one calibration parameter and the at least one heat flow; and still further comprising the steps of:

re-performing the simulation of the building to be simulated using the building simulator with the data representative of attributes of the building to be simulated and the data representative of measured driving forces that are capable of impacting the building to be simulated along with the variable to produce at least one intermediate output;

re-performing the different analysis to re-determine the at least one heat flow based, at least in part, on the at least one intermediate output; and iteratively repeating said steps of re-performing the simulation and re-performing the different analysis until a selected convergence is substantially attained to produce at least one calibrated output.

46. A data processing apparatus for calibrating a building simulator with corrective flows, comprising:

means for inputting, into the building simulator, data representative of attributes of a building to be simulated;

means for inputting, into the building simulator, data representative of measured driving forces that are capable of impacting the building to be simulated;

means for performing a simulation of the building to be simulated using the building simulator with the data representative of attributes of the building to be simulated and the data representative of measured driving forces that are capable of impacting the building to be simulated, said means for performing a simulation producing at least one output;

means for performing an analysis to estimate at least one calibration parameter based, at least in part, on the at least one output; and means for introducing a variable to the building simulator as a driving force, the variable being responsive to the at least one calibration parameter.

47. A computer-aided method for calibrating a building simulator with corrective flows, comprising the steps of:

performing a simulation of a building to produce at least one first output;

estimating at least one calibration parameter and determining at least one first heat flow based, at least in part, on the at least one first output;

re-performing the simulation of the building using a product comprised of the at least one calibration parameter and the at least one first heat flow to produce at least one second output;

determining at least one second heat flow based, at least in part, on the at least one second output; and re-performing the simulation of the building using another product comprised of the at least one calibration parameter and the at least one second heat flow to produce at least one third output.

48. The method according to claim 47, further comprising the steps of:

repeatedly determining at least one another heat flow based on at least one previous output of the simulation of the building; and repeatedly re-performing the simulation of the building using a product comprised of the at least one calibration parameter and the at least one another heat flow until at least one subsequent output indicates that a selected convergence level has been substantially attained.

49. The method according to claim 47, wherein (i) the product and the another product comprise a corrective heat flow and another corrective heat flow, respectively, (ii) the at least one calibration parameter comprises a shell calibration parameter, and (iii) the at least one first, second, and third outputs each comprise at least one of at least one simulated temperature and at least one simulated energy use.

50. A computer-aided method for calibrating a building simulator with corrective flows, comprising the steps of:

inputting, into the building simulator, data representative of attributes of a building to be simulated;

inputting, into the building simulator, data representative of measured driving forces that are capable of impacting the building to be simulated;

performing a simulation of the building to be simulated using the building simulator with the data representative of attributes of the building to be simulated and the data representative of measured driving forces that are capable of impacting the building to be simulated to produce at least one output;

performing an analysis to estimate at least one calibration parameter based, at least in part, on the at least one output;

performing a different analysis to determine at least one heat flow based, at least in part, on the at least one output;

introducing a variable to the building simulator as a driving force, the variable being responsive to the at least one calibration parameter and the at least one heat flow;

re-performing the simulation of the building to be simulated using the building simulator with the data representative of attributes of the building to be simulated and the data representative of measured driving forces that are capable of impacting the building to be simulated along with the variable to produce at least one intermediate output;

re-performing the different analysis to re-determine the at least one heat flow based, at least in part, on the at least one intermediate output; and iteratively repeating said steps of re-performing the simulation and re-performing the different analysis until a selected convergence is attained to produce at least one calibrated output.

51. An article of manufacture for improving a building simulation, comprising:

a computer-accessible storage medium;

computer programming stored on said storage medium;

wherein said computer programming is configured to be accessible from said computer-accessible storage medium by a processor and thereby cause said processor to operate so as to:

receive as input audit values of a building to be simulated, said audit values comprising at least shell audit values and Heating/Ventilating/Air Conditioning system audit values;

receive as input driving functions, said driving functions impacting the building to be simulated;

perform said building simulation using said audit values and said driving functions to produce a plurality of outputs;

determine a plurality of primary heat flows based, at least in part, on said plurality of outputs;

estimate a plurality of shell calibration parameters based, at least in part, on said plurality of outputs and said plurality of primary heat flows by a executing a best fit analysis;

calculate a plurality of corrective heat flows responsive to said plurality of primary heat flows and said plurality of shell calibration parameters;

introduce said plurality of corrective heat flows into at least one input of said building simulation; and re-perform said building simulation using said audit values and said driving functions, along with said plurality of corrective heat flows, to produce a different plurality of outputs.

52. A computer-aided method for calibrating a building simulator with shell calibration parameters, comprising the steps of:

inputting, into the building simulator, data representative of attributes of a building to be simulated;

inputting, into the building simulator, data representative of measured driving forces that are capable of impacting the building to be simulated;

performing a simulation of the building to be simulated using the building simulator with the data representative of attributes of the building to be simulated and the data representative of measured driving forces that are capable of impacting the building to be simulated to produce at least one first output;

performing a first best fit analysis to estimate at least one first shell calibration parameter based, at least in part, on the at least one first output and an expected value thereof;

modifying at least a portion of the data representative of attributes of the building to be simulated responsive to the at least one first shell calibration parameter to produce once-modified data representative of attributes of the building to be simulated; and re-performing the simulation of the building to be simulated using the building simulator with the once-modified data representative of attributes of the building to be simulated and the data representative of measured driving forces that are capable of impacting the building to be simulated to produce at least one second output.

53. The method according to claim 52, further comprising the steps of:

performing a second best fit analysis to estimate at least one second shell calibration parameter based, at least in part, on the at least one second output and the expected value thereof;

modifying at least a portion of the once-modified data representative of attributes of the building to be simulated responsive to the at least one second shell calibration parameter to produce twice-modified data representative of attributes of the building to be simulated; and re-performing the simulation of the building to be simulated using the building simulator with the twice-modified data representative of attributes of the building to be simulated and the data representative of measured driving forces that are capable of impacting the building to be simulated to produce at least one third output.

54. The method according to claim 53, further comprising the step of:

repeating the steps of performing best fit analyses, modifying the data representative of attributes of the building to be simulated responsive thereto, and re-performing the simulation until at least one produced output of the simulation meets at least one selected closeness criterion when compared to the expected value thereof.

55. The method according to claim 52, wherein the first, second, third, and produced outputs, as well as the expected value thereof, comprise at least one of energy use and inside temperature of the building to be simulated.

56. The method according to claim 52, wherein said step of performing a first best fit analysis to estimate at least one first shell calibration parameter based, at least in part, on the at least one first output and an expected value thereof comprises the step of performing the first best fit analysis to estimate the at least one first shell calibration parameter using, at least partly, a primary heat flow of the building to be simulated that is associated with the at least one first shell calibration parameter.

* * * * *

UNITED STATES PATENT AND TRADEMARK OFFICE
CERTIFICATE OF CORRECTION

PATENT NO. : 6,134,511
DATED : October 17, 2000
INVENTOR(S) : Krishnappa Subbarao It is certified that error appears in the above-identified patent and that said Letters Patent is hereby corrected as shown below:

<u>Column 25,</u>
Line 18, replace "providing audit inputs to said simulator, said audit inputs" with
-- providing audit inputs to said building simulator, said audit inputs --

Line 20, replace "providing at least one driving function input to said" with -- providing at least one driving function input to said building --

Line 22, replace "impacting said system;" with -- impacting said building system;"

Line 23, replace "providing at least one corrective flow input to said" with -- providing at least one corrective flow input to said buliding --

Line 25, replace "improving an accuracy of said simulator; and" with -- improving an accuracy of said building simulator; and --

Line 26, replace "performing a building simulation on said simulator using" with
-- performing a building simulation on said building simulator using --

Line 29, replace "simulation producing at least one output." with -- building simulation producing at least one output. --

Line 31, replace "providing at least one driving function input to said simu-" with --
providing at least one driving function input to said building simu- --

Line 35, replace "of weather elements to which said buliding is exposed, solar" with
-- of weather elements to which said building system is exposed, solar --

Line 36, replace "radiation to which said building is exposed, and occupancy-" with
-- radiation to which said building system is exposed, and occupancy- --

Line 37, replace "related characteristics of said buliding." with -- related characteristics of said building system. --

Line 39, replace "one output of said simulation comprises simulated fuel use" with
-- one output of said building simulation comprises simulated fuel use --

Line 40, replace "of said buliding to be simulated." with -- of said building system to be simulated. --

Line 42, replace "one output of said simulation comprises at least one simu-" with
-- one output of said building simulation comprises at least one simu- --

UNITED STATES PATENT AND TRADEMARK OFFICE
CERTIFICATE OF CORRECTION

PATENT NO. : 6,134,511
DATED : October 17, 2000
INVENTOR(S) : Krishnappa Subbarao It is certified that error appears in the above-identified patent and that said Letters Patent is hereby corrected as shown below:

Column 25, (continued)
Line 43, replace "lated inside temperature of said building to be simulated." with
-- lated inside temperature of said building system to be simulated. --

Line 47, replace "input to said simulator, performing a preliminary simu-" with
-- input to said building simulator, performing a preliminary simu- --

Column 26,
Line 10, replace "flow comprises a primary heat flow of said system to be" with
-- flow comprises a primary heat flow of said building system to be --

Line 12, replace "a static-loss-from-a-shell-of-said-system heat flow, a" with
-- a static-loss-from-a-shell-of-said-building-system heat flow, a --

Line 15, replace "said-system heat flow." with -- said-building-system heat flow --

Line 19, replace "after simulating said system under predetermined con-" with -- after simulating said building system under predetermined con- --

Line 39, replace "after simulating said system under predetermined conditions" with
-- after simulating said building system under predetermined conditions --

Line 26, replace "providing audit inputs to said simulator futher comprises" with
-- providing audit inputs to said building simulator further comprises --

Signed and Sealed this

Twentieth Day of August, 2002

Attest:

Attesting Officer

JAMES E. ROGAN
Director of the United States Patent and Trademark Office

UNITED STATES PATENT AND TRADEMARK OFFICE
CERTIFICATE OF CORRECTION

PATENT NO.    : 6,134,511
DATED         : October 17, 2000
INVENTOR(S)   : Krishnappa Subbarao It is certified that error appears in the above-identified patent and that said Letters Patent is hereby corrected as shown below:

<u>Column 26,</u>
Line 46, replace "providing audit inputs to said simulator further comprises" with -- providing audit inputs to said building simulator further comprises --

Signed and Sealed this

Twenty-sixth Day of November, 2002

Attest:

Attesting Officer

JAMES E. ROGAN
Director of the United States Patent and Trademark Office